United States Patent [19]
Lagsdin

[11] Patent Number: 6,109,650
[45] Date of Patent: Aug. 29, 2000

[54] STABILIZER PAD CONFIGURATIONS

[76] Inventor: Andry Lagsdin, 54 King Hill Rd., Hanover, Mass. 02339

[21] Appl. No.: 09/070,638

[22] Filed: Apr. 30, 1998

[51] Int. Cl.⁷ ..................................................... B60S 9/10
[52] U.S. Cl. ................... 280/763.1; 280/764; 280/765.1; 280/766.1
[58] Field of Search ........................... 280/763.1, 764.1, 280/765.1, 766.1; 212/301, 302, 303, 304, 305; 305/51; 248/633, 634, 677, 188.8, 188.9

[56] References Cited

U.S. PATENT DOCUMENTS

| | | |
|---|---|---|
| 2,277,939 | 3/1942 | Thalhammer . |
| 3,219,362 | 11/1965 | Epstein . |
| 3,244,301 | 4/1966 | Vaughan . |
| 3,495,727 | 2/1970 | Long . |
| 3,642,242 | 2/1972 | Danekas . |
| 3,721,458 | 3/1973 | Mitchell ................................ 280/764.1 |
| 3,754,777 | 8/1973 | Riggs et al. ......................... 280/150.5 |
| 3,831,774 | 8/1974 | Moore .................................... 212/145 |
| 3,881,692 | 5/1975 | Clarke .................................... 254/101 |
| 3,897,079 | 7/1975 | MacKenzie et al. ................ 280/764.1 |
| 3,913,942 | 10/1975 | MacKenzie et al. . |
| 3,924,876 | 12/1975 | Vaillant et al. ....................... 280/150.5 |
| 3,930,668 | 1/1976 | Schuerman et al. . |
| 3,945,666 | 3/1976 | Fritsch ................................. 280/150.5 |
| 3,976,306 | 8/1976 | Nault .................................... 280/763 |
| 3,990,714 | 11/1976 | Hornagold ............................ 280/765 |
| 3,998,470 | 12/1976 | Houston ................................ 280/301 |
| 4,023,828 | 5/1977 | MacKenzie et al. . |
| 4,039,206 | 8/1977 | Nault .................................... 280/763.1 |
| 4,073,454 | 2/1978 | Sauber .................................. 248/188.2 |
| 4,201,137 | 5/1980 | Lagsdin . |
| 4,204,714 | 5/1980 | Jocobson et al. ........................... 299/1 |
| 4,266,809 | 5/1981 | Wuerflein .............................. 280/766 |
| 4,397,479 | 8/1983 | Schmidt ............................... 280/764.1 |
| 4,473,239 | 9/1984 | Smart .................................... 280/763.1 |
| 4,515,520 | 5/1985 | Parquet et al. ......................... 414/718 |
| 4,546,996 | 10/1985 | Hanson ................................ 280/764.1 |
| 4,619,369 | 10/1986 | Mertens ................................. 212/189 |
| 4,761,021 | 8/1988 | Lagsdin ................................ 280/764.1 |
| 4,860,539 | 8/1989 | Parrett et al. .............................. 60/426 |
| 5,011,184 | 4/1991 | Loudon ................................ 280/766.1 |
| 5,015,008 | 5/1991 | Schupback .......................... 280/764.1 |
| 5,050,904 | 9/1991 | Lagsdin . |
| 5,051,057 | 9/1991 | Kremer . |
| 5,054,812 | 10/1991 | Lagsdin ................................ 280/764.1 |
| 5,310,217 | 5/1994 | Paskey et al. ........................ 280/763.1 |
| 5,338,255 | 8/1994 | Akehurst .................................. 454/292 |
| 5,466,004 | 11/1995 | Lagsdin . |
| 5,488,788 | 2/1996 | Durbin ...................................... 37/443 |
| 5,547,220 | 8/1996 | Lagsdin . |
| 5,564,871 | 10/1996 | Lagsdin . |
| 5,667,245 | 9/1997 | Lagsdin . |
| 5,730,455 | 3/1998 | Varnum, Sr. et al. . |

FOREIGN PATENT DOCUMENTS

| | | |
|---|---|---|
| 492912 | 5/1953 | Canada . |
| 1029715 | 4/1978 | Canada . |
| 1036148 | 8/1978 | Canada . |

*Primary Examiner*—Kevin Hurley
*Assistant Examiner*—Hau Phan
*Attorney, Agent, or Firm*—Wolf, Greenfield & Sacks, P.C.

[57] ABSTRACT

Pad assemblies configured to be used in conjunction with stabilizer pads mounted onto stabilizer arms used to stabilize earth moving and other construction equipment. The pad assemblies are formed from a resilient laminate mounted onto a bracket which in turn is mounted onto the stabilizer pad. In one embodiment, the bracket includes side flaps for capturing the laminate therebetween. Preferably, the bracket is formed of a single piece of metal. A bolt, pin, rivet or the like is used to secure the laminate to the side flaps. Methods of forming the pad assemblies are also disclosed. In particular, a reverse camber is provided to the top surface of the bracket so that when the side flaps are bent downwardly, the top surface does not bow upwardly. Reinforcing ribs are also provided for the same purpose. Bowing is also minimized by facilitating the bending operation by cutting out material along the fold lines, to decrease the resistance to bending of the material. Other embodiments include a bracket with a lip extending into a correspondingly formed notch to hold the laminate within the bracket.

31 Claims, 10 Drawing Sheets

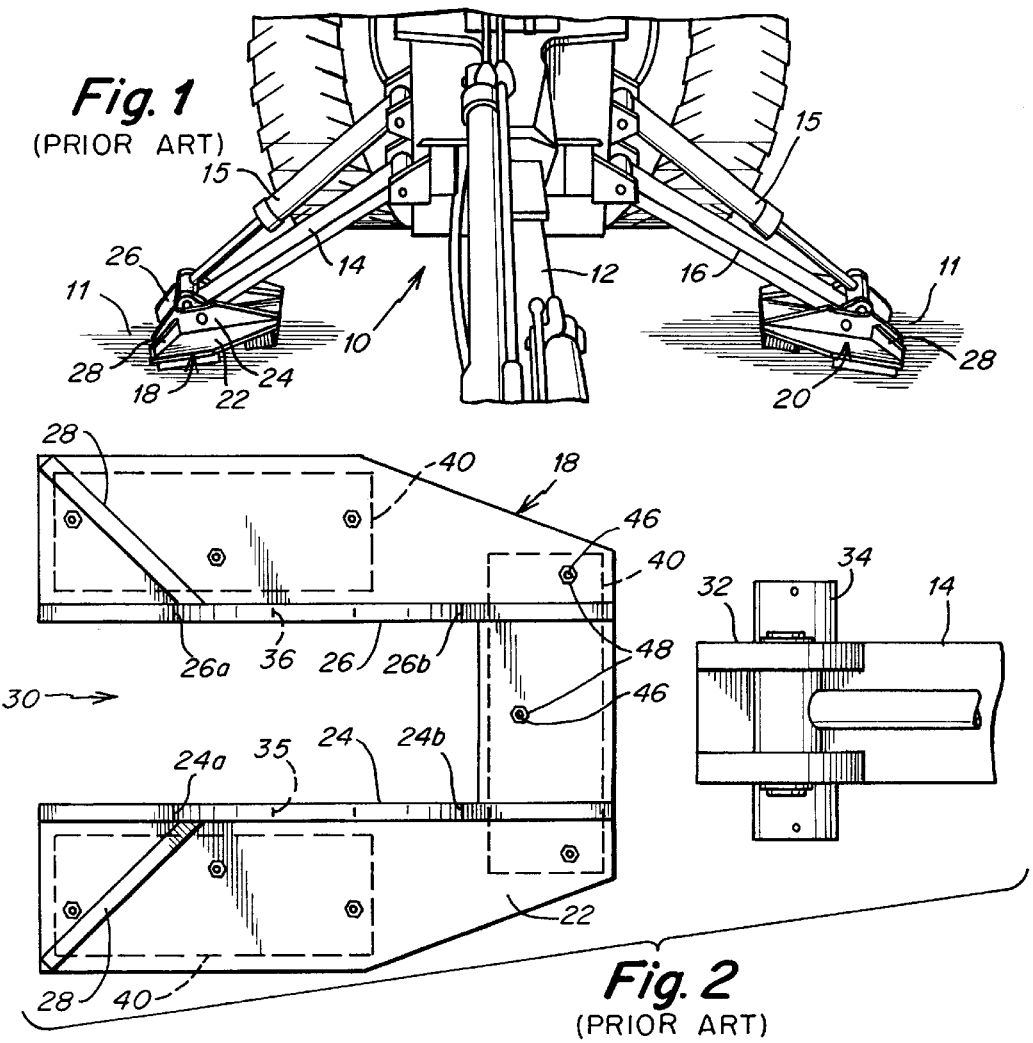
Fig. 1 (PRIOR ART)
Fig. 2 (PRIOR ART)
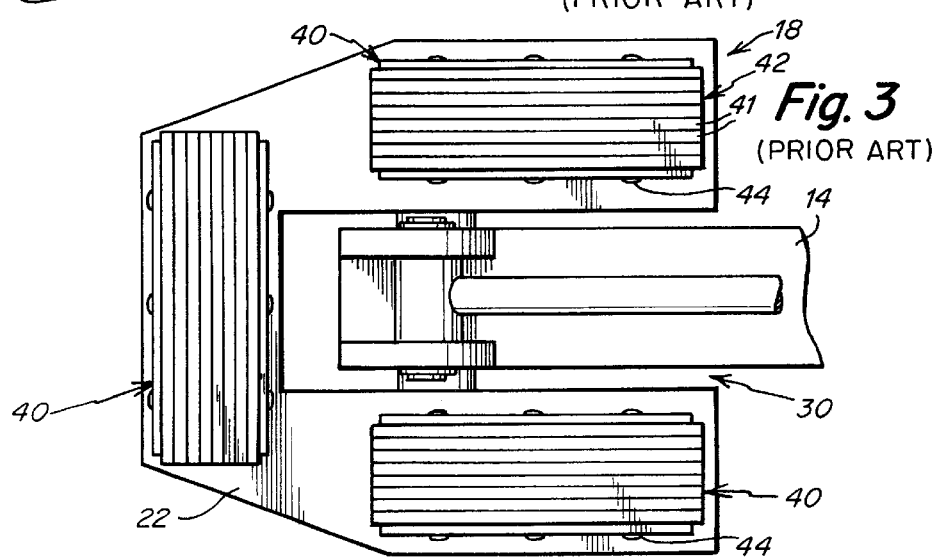
Fig. 3 (PRIOR ART)

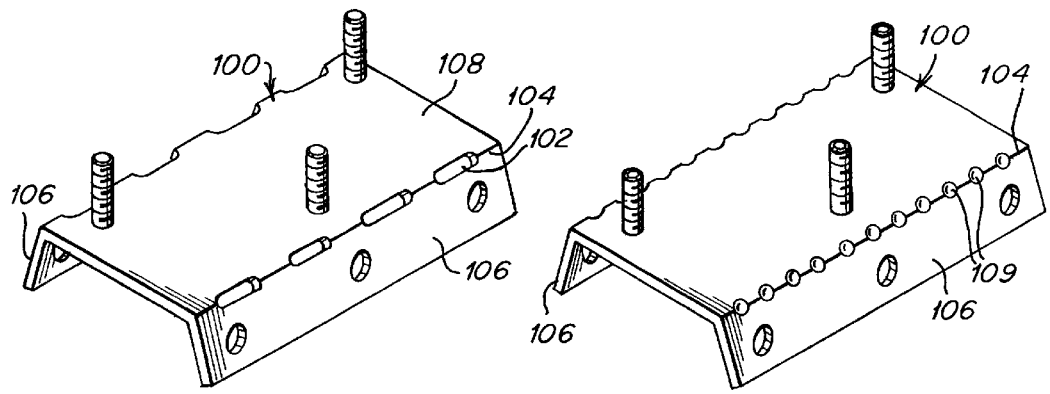
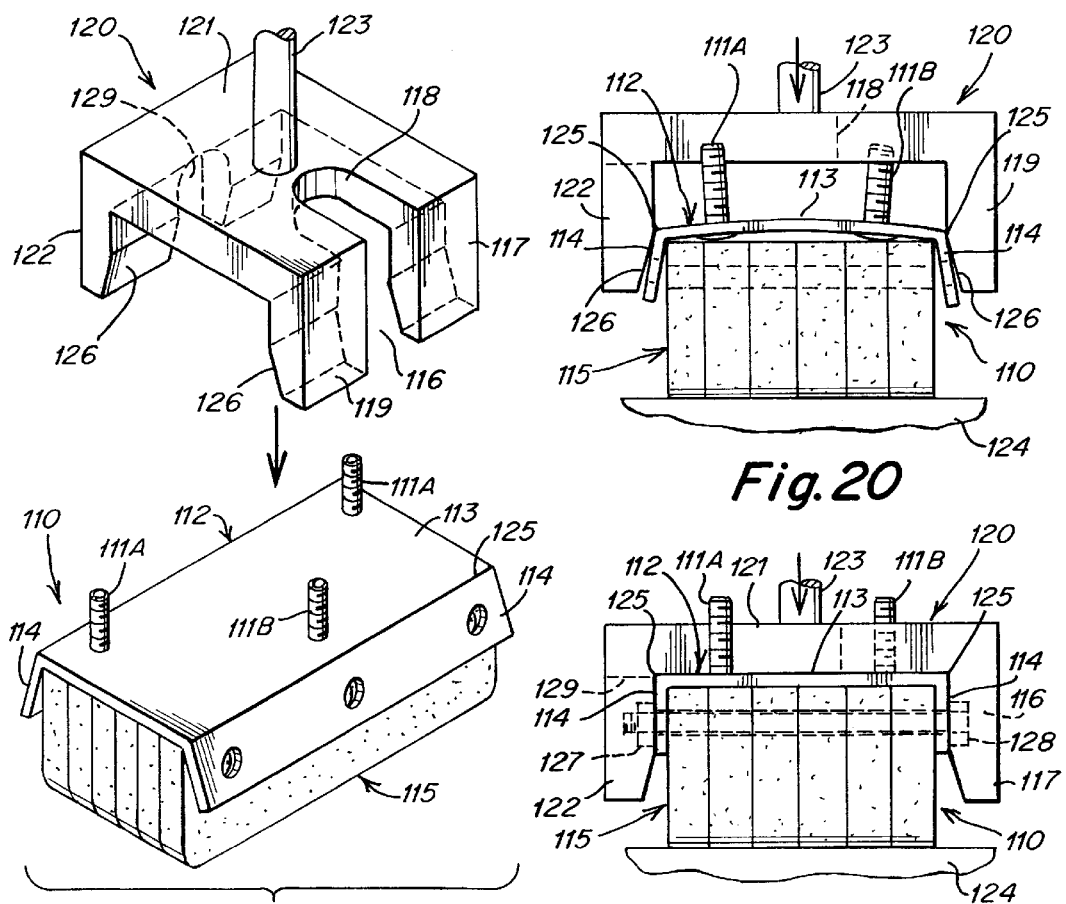

STABILIZER PAD CONFIGURATIONS

FIELD OF THE INVENTION

This invention relates generally to stabilizer pads for vehicles, and more particularly to improved stabilizer pad configurations which can be used in conjunction with a pivotally mounted, two-way stabilizer pads.

BACKGROUND OF THE INVENTION

Construction equipment, such as earth-moving vehicles and the like, must be stabilized during construction or digging operations to prevent movement of the equipment or vehicles. Typically, stabilization is provided by hydraulically actuated arms that extend from the vehicle and that have earth-engaging pads mounted on their distal ends. When the vehicle or equipment is moved into a working position, if extra stability is needed, the stabilizer arms are hydraulically operated to move from a retracted position, in which the arms generally extend upwardly and out of the way, to a user position in which the arms extend downwardly at an acute angle to the ground surface so that the pads contact the ground surface. When it is desired to move the vehicle, the arms are returned to the retracted position, and the vehicle is moved to a new operating location.

Reversible stabilizer pads for construction equipment, such as earth-moving vehicles and the like, are well-known in the prior art. Examples of such pads are found in U.S. Pat. Nos. 4,761,021 and 4,889,362. Such stabilizer pads generally have a first surface for engagement with a softer surface, such as gravel and soft earth, and a more resilient second surface on the opposite side of the first surface for engagement with harder surfaces, such as concrete or asphalt. Typically, the first surface includes flanges with grouser points that permit the pads to dig into the softer, unfinished surface formed by gravel or soft earth, to better anchor and stabilize the vehicle when encountering difficult digging conditions. The first surface is unsuitable for contact with a hard surface, since the grouser points could damage or mar the hard asphalt or concrete. The second surface of the pad typically is formed of a laminated, rubber pad for better stability on the more solid surface provided by concrete or asphalt. The stabilizer pad typically is pivotally mounted to the distal end of the hydraulically operated arm so that the pad may be rotated to contact the ground with either the first surface or the second surface.

While such prior art laminated structures are suitable for engagement with concrete or asphalt, the construction of such pads is expensive, labor-intensive and time consuming. It is desirable to provide suitable laminated pad assemblies for use on the resilient, second surface of the stabilizer pad that can be fabricated in an automated manner, and that provide improved stability and longer wear.

SUMMARY OF THE INVENTION

To achieve the foregoing desired objectives, in accordance with the present improved invention, there are provided resilient, laminated stabilizer pad assemblies for stabilizer pads for use on the side of the pad opposite the grouser points for engagement with hard asphalt or concrete surfaces. The improved pad assemblies of the present invention are preferably for use in conjunction with reversible stabilizer pads, but may also find use in connection with other pad applications.

In accordance with one aspect of the present invention, the resilient stabilizer pad assemblies include a bracket which typically is formed from a piece of metal and which is bent or otherwise deformed to partially surround and capture the resilient portion of the pad assembly. The resilient portion of the pad assembly typically is a laminate formed of a plurality of parallel layers of rubber or other like materials. The laminate is attached to the bracket by a connector or pin which passes through each of the layers of the laminate. Extending from an upper surface of the bracket are a plurality of mounting devices, such as studs or bolts which are adapted to pass through a plate on the stabilizer pad to permit the attachment and removal of the pad assemblies as needed.

In another aspect of the invention, each of the brackets is formed of a planar piece of material such as steel which is bent during the forming process. In one embodiment flaps are formed which capture the laminate between them and hold the layers together. To prevent the upper flat surface of the bracket from bowing during the forming process, a force must be applied downwardly toward the laminate. In another aspect of the present invention, a reverse bend or camber is applied to the upper flat surface of the bracket to offset the bowing tendency of the bracket. In another embodiment, reinforcing ribs are provided to prevent bowing of the bracket.

In another embodiment, bowing of the bracket may be minimized and bending of the flaps may be facilitated by the removal of material along the fold lines, such as by forming score lines or holes or the like along the fold lines.

In another aspect of the invention, various techniques may be utilized to secure and restrain the laminated layers, including a nut and bolt, welded pins, or a pin welded at one end and threaded at the other for attachment of a nut.

In yet another aspect of the present invention, inaccuracies or lack of standardization of the thicknesses of the layers of the laminate can be accommodated by the provision of a compressible layer of material disposed amongst the layers of the laminate that may be compressed to the desired size by applying lateral forces to the laminate.

In yet another aspect of the invention, the laminate may be affixed to the bracket by lips extending from flaps on the bracket into notches or channels formed in the laminate.

In yet another aspect of the invention, the laminate may include multiple projections and is affixed to a metal frame which includes strips residing in valleys disposed between the projections formed in the laminate.

In yet another further aspect of the invention, the layers of the laminate may not be of all the same height. Rather, they may be stepped in such a manner that the layers adjacent the flaps of the bracket have the smallest height, while the layers in the center of the pad farthest from the flaps have the greatest height. This arrangement prevents splaying of layers of the laminate closest to the flaps of the bracket.

Other embodiments of this invention relate to the methods for assembling the pad assemblies described above.

The foregoing pad assemblies made in accordance with the present invention can be constructed more quickly and cheaply than prior art pad assemblies which required multiple, manual steps. Such pad assemblies provide superior performance and may be attached to and removed from existing stabilizer pads in the same manner as prior art pad assemblies. Finally, particularly with respect to some of the embodiments described above, the structures permit a greater thickness of resilient material below the lower edge of the bracket, thus providing a longer life to the pad.

DESCRIPTION OF THE DRAWINGS

The objects, advantages and features of this invention will be more clearly appreciated from the following detailed description when taken in conjunction with the accompanying drawings, in which:

FIG. 1 is a fragmentary, pictorial view of a typical prior art loader/backhoe having stabilizer arms with pads;

FIG. 2 is an exploded, plan view of one surface of the stabilizer pad of FIG. 1;

FIG. 3 is a plan view of the opposite side of the stabilizer pad of FIG. 2 illustrating the resilient pad assemblies;

FIG. 17 is a perspective view of yet another embodiment of the bracket of this invention;

FIG. 18 is a perspective view of yet another further embodiment of the bracket of this invention;

FIG. 19 is an exploded, perspective view illustrating a tool for assembly of pad assemblies of this invention;

FIG. 20 is an elevational, end-view showing use of the tool of FIG. 19;

FIG. 21 is an elevational, end-view showing a further assembly step utilizing the tool of FIG. 19;

DETAILED DESCRIPTION

Figure 4:
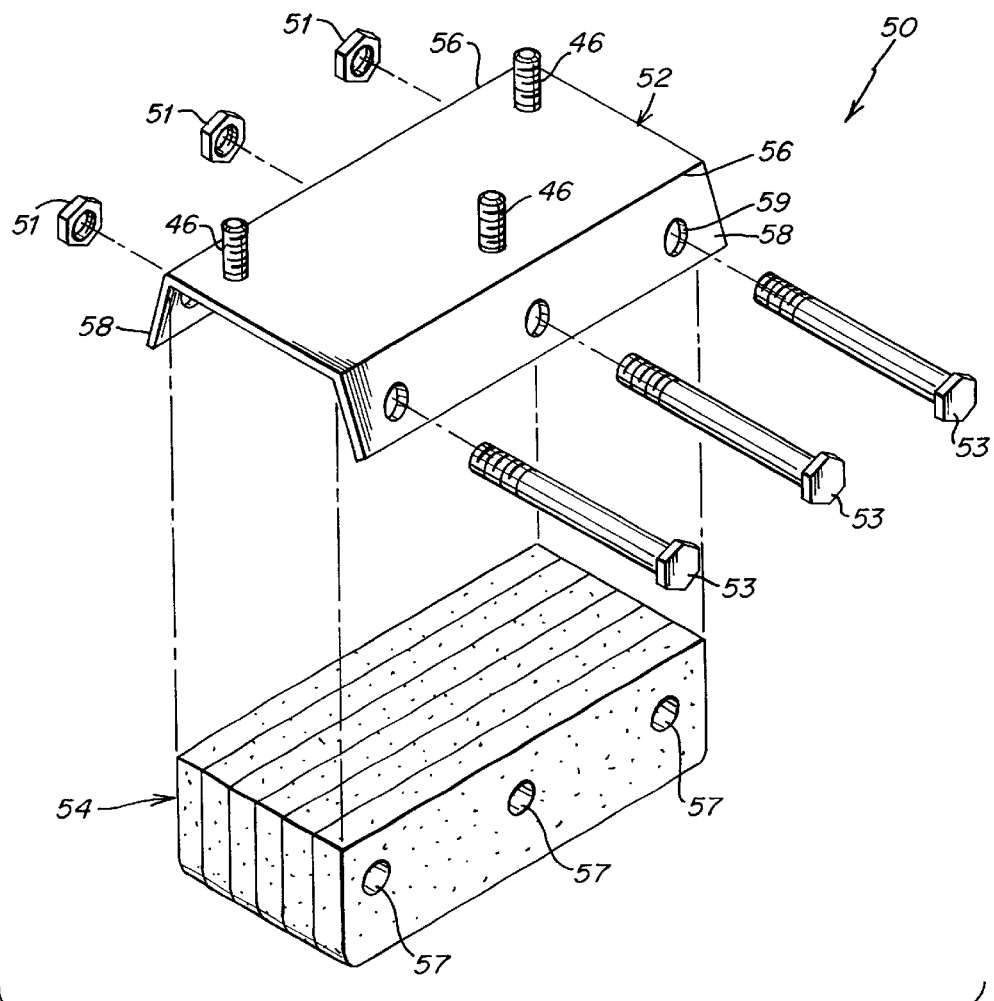
FIG. 4 is an exploded, perspective view of one embodiment of a pad assembly of the present invention.

FIGS. 1–3 illustrate a typical piece of construction equipment or earth-moving apparatus, such as a loader/backhoe 10 with which the stabilizer pad assemblies of this invention are intended to be utilized. Backhoe 10 includes a shovel mechanism 12, stabilizer arms 14 and 16 and associated stabilizer pads 18 and 20 respectively. Hydraulic piston 15 typically operates each stabilizer arm 14 and 16 independently of the other. FIG. 1 illustrates the positions of arms 14 and 16 during operation of the shovel mechanism to provide the desired lateral stability to backhoe 10 to prevent lateral movement of backhoe 10. As can be seen, arms 14 and 16 are disposed on opposite sides of backhoe 10 adjacent shovel mechanism 12. Each arm 14 and 16 extends from backhoe 10 to form an acute angle with respect to an underlying surface 11 upon which backhoe 10 and arms 14 and 16 rest. Surface 11 typically could be formed of soil, rock, asphalt, gravel or concrete, although backhoe 10 may be used in conjunction with other types of surfaces where a digging operation is desired. As can be seen in FIG. 1, pads 18 and 20 press against surface 11. The angle formed by arms 14 and 16 with respect to surface 11 is such that pads 18 and 20 typically are disposed outwardly away from the center of backhoe 10 beyond the tires of backhoe 10, although a position closer to backhoe 10 within the outer edge of the tires is also possible. When it is desired to stop the digging operation and move backhoe 10 to a different location, pistons 15 associated with each arm 14 and 16 are withdrawn so that arms 14 and 16 pivot upwardly away from surface 11 so that pads 18 and 20 are elevated above surface 11 and are not in contact therewith.

Pads 18 and 20 preferably are pivotally mounted to the distal ends of respective arms 14 and 16. This pivotal mounting permits the pads to accommodate the acute angle between arms 14 and 16 and surface 11 and permits the pads to be flipped from one position to another, so that either side of the pad may be selectively placed in position to engage surface 11. The pads may be flipped when they are elevated above surface 11 by piston 15. Once the flipping operation has been completed, hydraulic piston 15 may be actuated to lower arms 14 and 16 until respective pads 18 and 20 are in engagement with surface 11, as shown in FIG. 1.

FIG. 2 illustrates the structure of one side of a typical pad 18 or 20, while FIG. 3 illustrates the structure of the opposite side of the same pad 18 or 20. The side of pad 18 or 20 illustrated in FIG. 2 typically is used on a yielding surface such as dirt or gravel where one is not concerned with whether the surface is defaced or broken. The side of the pad illustrated in FIG. 2 displays a hard surface with no resiliency and with projections as will be described. The side of the pad illustrated in FIG. 3 is for use with asphalt or concrete where it is undesirable for the pad to dig into the surface or mark the surface, and where some level of resiliency is desired.

Pads 18 and 20 each include a substantially flat plate 22. On the side of plate 22 shown in FIG. 2, flanges 24 and 26 extend from plate 22 generally perpendicularly of the surface thereof. As illustrated in FIG. 2, upstanding ribs 28 are provided and extend outwardly away from respective flanges 24 and 26 to provide structural strength. Disposed between flanges 24 and 26 is a notch or cutout 30. The width of notch 30 is at least as wide as arm 14 or 16 to accommodate arm 14 or 16 during rotation of pad 18 or 20. A pin 34 extends through the distal end of arm 14 or 16 and through associated holes 35 and 36 in respective flanges 24 and 26 to pivotally mount arm 14 or 16 to respective pad 18 or 20. Pin 34 may be secured in place using a cotter pin, or pin 34 may be threaded to accommodate a nut for retaining pad 18 or 20 on respective arm 14 or 16.

Typically, grouser points 24a and 24b are found on an edge of flange 24, and grouser points 26a and 26b are found on an edge of flange 26. Grouser points 24a, 24b, 26a, and 26b engage surface 11. As a result, there are four points of contact per pad providing stability to the pad, and preventing rocking of the pad. Preferably, grouser points 24a and 24b on flange 24 and grouser points 26a and 26b on flange 26 are disposed symmetrically about the pivot point defined by pin 34 so as to enhance the stability of the pad.

With reference now to FIG. 3, the resilient side of each pad 18 and 20 will be described. FIG. 3 illustrates three pad assemblies 40, although fewer or more pad assemblies could be used depending on the particular construction of pads 18 and 20. Each pad assembly 40 typically comprises a laminate 42 formed of a plurality of layers 41 which are compressed together. Typically, layers 41 are held together by a bolt 44. Typically, each layer 41 is pre-drilled with holes when cut to receive the bolts 44. Each pad assembly 40 is secured to plate 22 by a series of bolts 46 or the like having associated nuts 48.

Preferably, each layer 41 is formed of rubber or some other resilient material. Each layer 41 typically has a thickness of the order of ¼" to ¾" in its uncompressed state, and preferably has a thickness of about ¼" in an uncompressed state. In a typical laminate 42, eight to ten layers 41 may be employed, although a larger or smaller number may be used for particular applications. A preferred material for layers 41 is a sidewall segment of a truck-tire carcass. It is preferred not to use steel belted tires for forming layers 41 because it is more difficult to cut a steel belted tire into the desired sizes and shapes. Truck tires are preferred as the source of material for layers 41 because truck tires typically are of 10-ply or greater. A multiply truck tire is preferred because it provides a relatively high ratio of cord to rubber thickness. The thickness of the cord that provides the primary stability is preferably four times that of the thickness of the rubber in such tires. The greater the ply number of the tire, the greater is the stability of the laminate formed by layers 41. As a result, each layer 41 is of a proper thickness and provides the proper durability and stiffness.

A first embodiment of the pad assemblies of this invention will now be described with particular reference to FIGS. 4–6. Like numbers will be used for like parts where applicable. Pad assembly 50 of this invention includes a bracket 52 and laminate 54 which is substantially identical to laminate 42. In this embodiment, bolts 46 typically are either pressed in place studs, or are more traditional carriage bolts which extend through bracket 52, as shown, to allow mounting of assembly 50 to plate 22.

Bracket 52 typically is formed of a sheet of steel or the like, which is cut to size, and which is in a flat configuration prior to assembly. During the assembly process, bracket 52 is deformed along fold or bend lines 56 to form side flaps 58 to capture laminate 54 therebetween. Preferably, laminate 54 has been preformed into the desired thickness, and so that the distance between fold lines 56 is equal to the thickness of laminate 54. Holes 57 in laminate 54 and holes 59 in flaps 58 have been pre-drilled and are aligned during the assembly process as shown in FIGS. 5 and 6. Thereafter, connector devices 53 are inserted therethrough to secure laminate 54 between flaps 58. Devices 53 typically are carriage bolts with associated nuts 51 as shown, although devices 53 could be other types of connectors as will be described. The assembly process typically is a two step process in which flaps 58 are folded about lines 56 to capture laminate 54 in a first step, and in which devices 53 are inserted in a second step. The heads of bolts 46 are imbedded into the top surface of laminate 54 when the assembly is complete.

Figure 6:
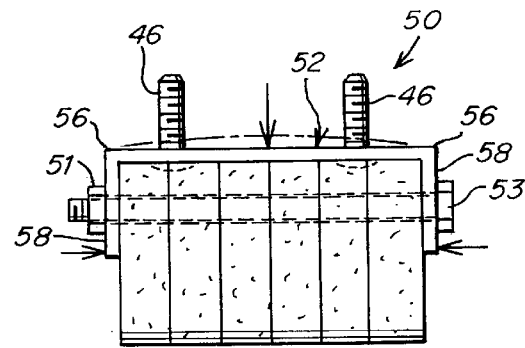
FIG. 6 is an elevational, end-view of the pad assembly of FIG. 4 in its assembled condition.

During the folding of flaps 58 about lines 56, there is a tendency for the upper surface of bracket 52 to bow upwardly away from laminate 54 as shown by the dashed line in FIG. 6. A flat upper surface of bracket 52 is desired, so that when assembly 50 is attached to plate 22, the bond is secure, and there is no rocking or movement of assembly 50 with respect to plate 22. Any such rocking or movement would provide instability which is undesired and which could be detrimental to the stability of apparatus 10. Therefore, during the forming process, appropriate pressure must be placed downwardly against the upper surface of bracket 52 and against flaps 58 as shown by the arrows in FIG. 6.

Figure 7:
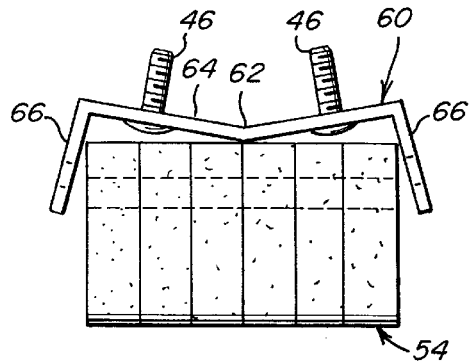
FIG. 7 is an elevational, end-view of another embodiment of the pad assembly of this invention.
Figure 8:
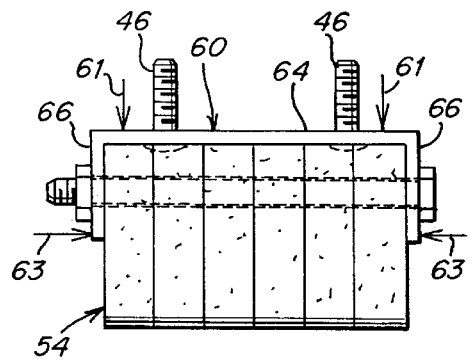
FIG. 8 is an elevational end-view of the pad assembly of FIG. 7 in its assembled condition.

Another embodiment of this invention will now be described with reference to FIGS. 7 and 8. This embodiment minimizes or prevents the bowing just described with respect to the upper surface of bracket 52. Bracket 60 of FIGS. 7 and 8 includes a top surface 64 and side flaps 66. As illustrated in FIG. 7, during the formation of bracket 60, a reverse camber or bend 62 is applied to surface 64 prior to or simultaneously with the formation of flaps 66. In this way, when a tool is utilized to apply pressure as illustrated by the arrows in FIG. 8 to force bracket 60 downwardly onto laminate 54 and to apply the necessary lateral pressure to flaps 66, the reverse bend 62 in surface 64 prevents or minimizes the bowing illustrated in FIG. 6. This reverse bend 62 could be an actual crease applied in upper surface 64 by bending bracket 60 about a tool, or reverse bend 62 could be a more gradual and less abrupt camber applied to surface 64 with a large radius of curvature, such as by pre-stressing surface 64 in a known manner. Thus, when pressure is applied to align the holes in flaps 66 with the holes in laminate 54 during the formation process, as shown by the arrows 61 and 63, the tendency of upper surface 64 to bow upwardly is offset by bend 62 so that the result is a generally flat upper surface 64 as shown in FIG. 8.

Figure 9:
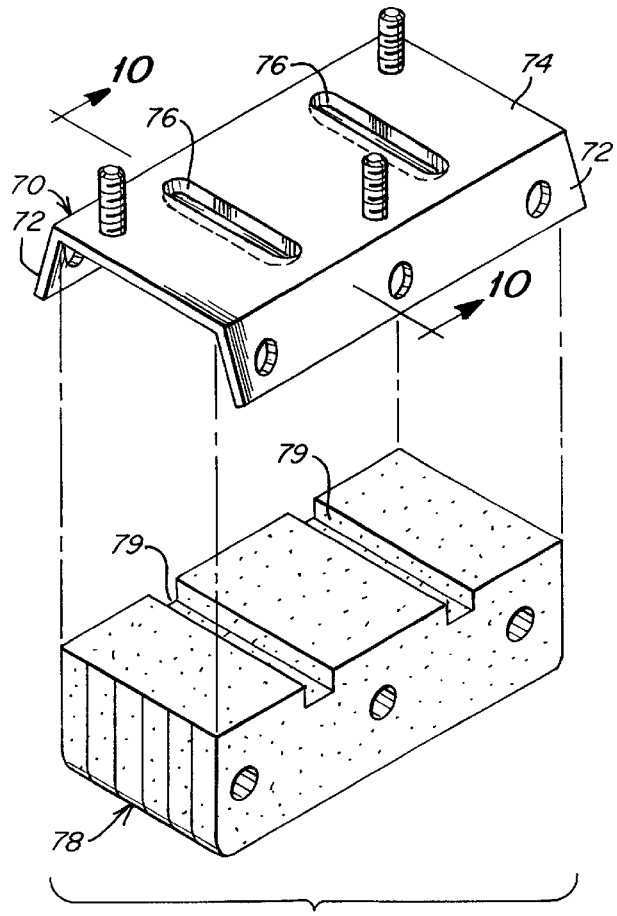
FIG. 9 is an exploded, perspective view of another embodiment of the pad assembly of this invention.
Figure 10:
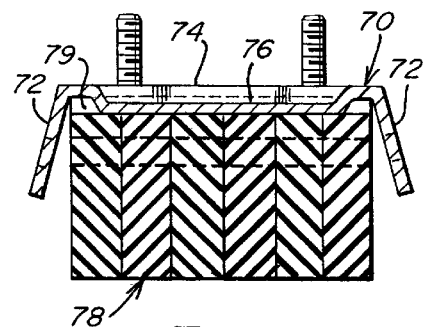
FIG. 10 is a cross-sectional, end-view illustrating assembly of the pad assembly of FIG. 9, taken along line 10—10 in FIG. 9.
Figure 11:
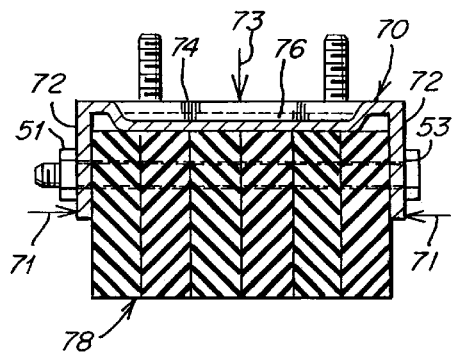
FIG. 11 is a cross-sectional, end-view of the pad assembly of FIG. 9 in its assembled condition.

Another embodiment of the pad assembly of this invention will now be described with reference to FIGS. 9–11. The embodiment of FIGS. 9–11 also overcomes the problem of bowing of the upper surface of the bracket. This embodiment includes laminate 78 and bracket 70 which includes top surface 74 and side flaps 72. Bracket 70 includes reinforcing ribs 76 on upper surface 74, to provide a desired level of strength and rigidity to surface 74. Preferably, ribs 76 represent portions of surface 74 which have been deformed downwardly as shown in FIGS. 9–11 to form a depression in surface 74 which extends downwardly below the lower surface of surface 74. Alternatively, ribs 76 could be separate strips of material which are either welded or in some other way bonded to the lower side of surface 74. FIG. 9 illustrates two such ribs 76, although one rib or more than two ribs could also be used so long as the desired rigidity is provided to surface 74. To accommodate ribs 76, laminate 78 has corresponding cutouts 79 that are formed in an upper surface and that are at least as large as ribs 76 to allow ribs 76 to seat therein when the assembly is fully formed, as shown in FIGS. 10 and 11. Laminate 78 is identical in all other respects to laminate 54, except for the provision of cutouts 79, and will not be further described.

During the assembly process, typically ribs 76 are formed or added at the same time that the stock is initially cut from which bracket 70 is formed. If the ribs are formed from the material of bracket 70, ribs 76 are stamped into bracket 70 in a known manner. Thus, bracket 70 would be provided as a flat sheet with the ribs stamped therein. During the assembly process, bracket 70 is placed on the top of laminate 78 as shown in FIG. 10. Thereafter, a tool applies a lateral force to bend flaps 72 as shown by arrow 71 while downward pressure is applied to surface 74 as shown by arrows 73. Once the desired configuration has been formed, bolts 53 are inserted and nuts are applied in a known manner. Any bowing of surface 74 is prevented by ribs 76 so that a flat surface is provided.

Figure 12:
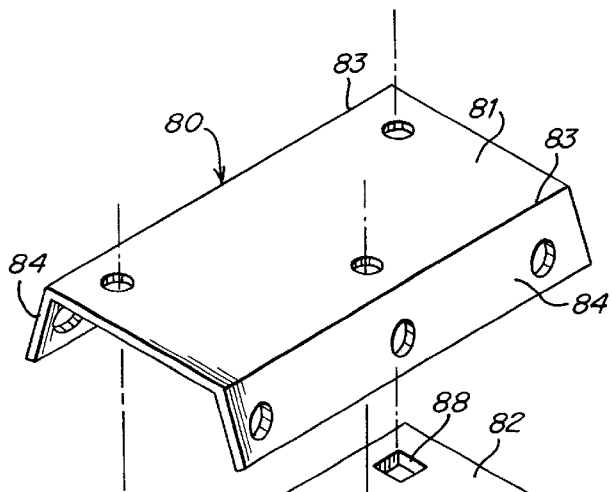
FIG. 12 is an exploded, perspective view of yet another embodiment of the bracket of this invention.
Figure 15:
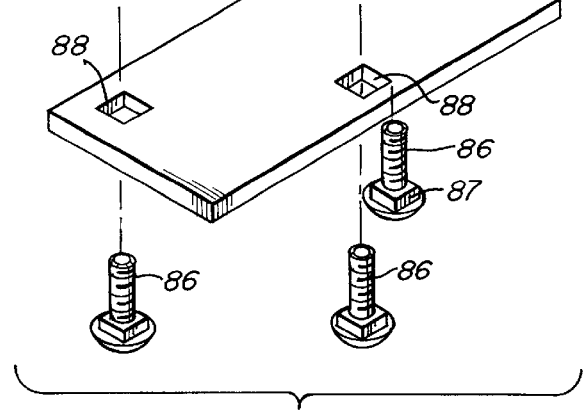
FIG. 15 is a perspective view of another embodiment of the bracket of this invention.

Another embodiment of this invention will now be described with reference to FIGS. 12–14, and includes bracket 80 and laminate 54. Bracket 80 of this embodiment includes top surface 81 and side flaps 84. This embodiment further includes a reinforcing plate 82 made of a metal such as steel or the like which is disposed between top surface 81 and laminate 54. Plate 82 provides several functions. In the first place, plate 82 provides a bearing surface or anvil about which flaps 84 may be folded to form fold lines 83. By dimensioning plate 82 to be substantially equal in width to the width of laminate 54, it can be assured that during the assembly process, fold lines 83 are formed in the right position to permit flaps 84 to tightly capture laminate 54 therebetween. Secondly, plate 82 assures that straight and sharp fold lines 83 are formed during the assembly process. Thirdly, plate 82 provides reinforcement to upper surface 81 to provide additional strength to the assembly. Fourthly, plate 82 assists in preventing bowing of upper surface 81. Finally, as shown in FIG. 12, square or rectangular cutouts 88 can be provided for bolts 86 that attach the pad assembly to plate 22. If the heads of bolts 86 are provided with correspondingly formed, square or rectangular portions 87 which seat within cutouts 88, rotation of bolts 86 is prevented during the process of attaching the assembly to plate 22.

Figure 13:
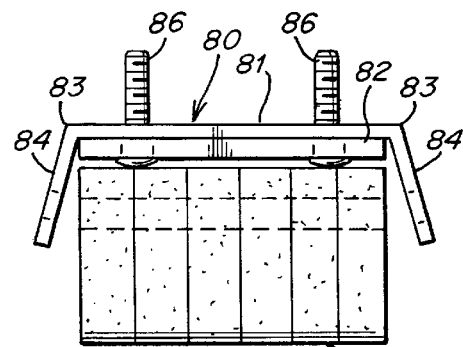
FIG. 13 is an elevational, end-view illustrating assembly of the bracket of FIG. 12.
Figure 14:
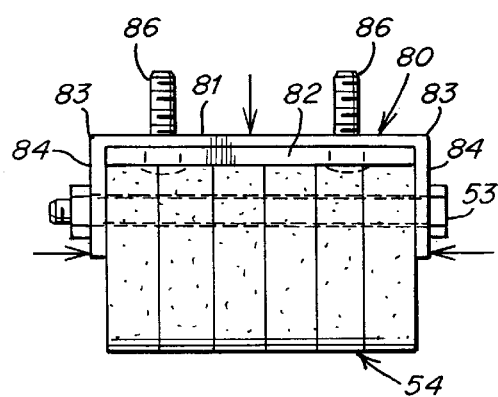
FIG. 14 is an elevational end-view of the assembly of FIG. 13 in its assembled condition.

As illustrated in FIGS. 13 and 14, flaps 84 of bracket 80 are bent along fold lines 83 as previously described during the assembly process. A tool provides the necessary force to the top surface 81 and to flaps 84 as illustrated by the arrows in FIG. 14 to complete the assembly process, and to allow a bolt or pin 53 to be inserted through holes formed in flaps 84 and in laminate 54, as previously discussed. As force is applied to upper surface 84, plate 82 is urged into contact with an adjacent surface of laminate 54 and the head of each bolt 86 is embedded into laminate 54.

Figure 16:
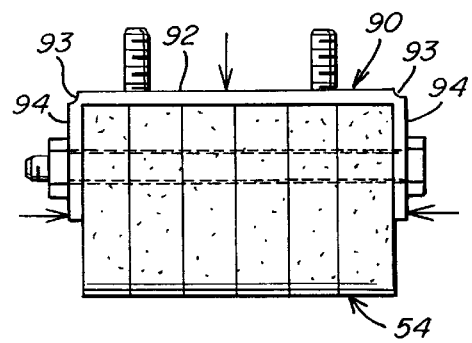
FIG. 16 is an elevational, end-view of a pad assembly utilizing the bracket of FIG. 15.

FIGS. 15–18 illustrate another aspect of the present invention in which the formation of fold lines and bending of the flaps on the bracket are facilitated. In particular, in FIGS. 15 and 16, the plate of sheet metal which is to be formed into bracket 90 is provided with a cut or score line 93 where each fold line is to be formed for a flap 94. Cut 93 can be formed using a stamp, a saw blade or some other like sharp device which removes material and provides an area of reduced thickness along the fold line used to form flap 94. Typically, although not necessarily, cut 93 extends less than halfway through the thickness of the material of bracket 90, so that the strength of bracket 90 is not unduly compromised. Bracket 90 is then formed in the manner previously described by the use of a tool which provides lateral forces on flaps 94 and a downward force on surface 92 to cause flaps 94 to bend about the cut 93 and into the shape as shown in FIG. 16.

FIGS. 17 and 18 illustrate alternative embodiments related to this aspect of the invention. Instead of cuts 93, bracket 100 includes cutouts 102 along fold lines 104 to permit formation of flaps 106. Cutouts 102 of necessity must be spaced from one another and extend entirely through the material forming bracket 100. As illustrated in FIG. 17, cutouts 102 preferably are slots elongated along the fold line. Cutouts 102 may be formed by stamping, drilling, milling or by any other known technique. Cutouts 102 could also be circular in shape and more closely spaced to provide the same effect. Cutouts 102 function in generally the same fashion as cuts 93. Cutouts 102 should be spaced sufficiently to allow formation of flaps 106 but should be sufficiently close to provide the desired structural strength.

In FIG. 18, cutouts 102 and cuts 93 are replaced by dimples 109. Dimples 109 represent a series of spaced depressions aligned along fold line 104. Dimples 109 do not extend all the way through the material of bracket 100. Rather, they represent removal of enough material to extend part of the way through the material to provide a weakened area along fold line 104. Dimples 109 may be stamped, drilled, milled or formed in any other conventional manner so long as dimples 109 do not extend entirely through the material of bracket 100. Dimples 109 should be spaced sufficiently far apart so that the material of bracket 100 retains the structural strength necessary to hold together layers 54. However, dimples 109 should be sufficiently close that fold line 104 is adequately defined and flap 106 is readily bent.

The provision of cuts 93, cutouts 102 or dimples 109 has several benefits. In the first place, any upward bowing of the top surface 108 of the bracket is minimized, since there is lesser resistance to the bending of the flaps. Secondly, the provision of cuts 93, cutouts 102 or dimples 109 ensures that the flaps are bent or formed at precisely the locations desired to minimize if not totally eliminate any tolerance errors due to tool malfinction or movement of the bracket during assembly. Thirdly, cuts 93, cutouts 102 or dimples 109 permit a reduction in the amount of lateral force required to be applied to the flaps, as the flaps will more easily bend.

Another aspect of the present invention will now be described with reference to FIGS. 19–21 which illustrate a tool 120 that may be used to form any of the embodiments of FIGS. 4–18. Pad assembly 110 of FIG. 19 represents any one of the embodiments of FIGS. 4–18 and includes laminate 115 and bracket 112 having an upper surface 113 and flaps 114. Laminate 115 is captured between flaps 114 as previously discussed. Studs or bolts 111A and 111B allow mounting of assembly 110 to plate 22 as previously discussed.

Tool 120 includes a mounting shaft 123, top plate 121, spaced side legs 119, and side plate 122. Shaft 123 is adapted to be affixed or mounted onto a conventional machine tool which raises and lowers tool 120 as necessary to perform the assembly process. Top plate 121 applies a downward force to surface 113 to drive it against laminate 115 to minimize bowing of surface 113. Legs 119 and plate 122 serve to bend flaps 114 about fold lines 125 during the forming process. The lower edges of plate 122 and legs 117 are provided with sloped surfaces 126 to facilitate the bending process and to permit engagement of flaps 114 without causing any lateral movement of bracket 112 as it is being formed. Preferably, the spacing between the inside surface of plate 122 and the inside surfaces of legs 117 and 119 is equal to the thickness of laminate 115 plus the thickness of flaps 114, or equal to the forming between fold lines 125. Legs 119 preferably are spaced from one another by a gap 116 sufficient to accommodate the head of a bolt 128 extending through flaps 114 and laminate 115. Top plate 121 preferably includes a slot 118 to accommodate a bolt or stud 111B during the stamping process. Back plate 122 preferably includes a cutout 129 to accommodate the end of a bolt 128 and a nut 127.

The method of this aspect of the invention will now be described with reference to FIGS. 19–21. Initially, laminate 115 is formed by cutting and aligning its layers. Holes designed to accommodate a plurality of bolts 128 are drilled through the laminate 115 in a direction perpendicular to the alignment of the individual layers as previously discussed. Bolts 111A and 111B are inserted through upper surface 113 of bracket 112 and are pressed in place, or are otherwise restrained in a known manner to prevent them from falling out, and to prevent bolts 111A and 111B from rotating. Thereafter, bracket 112 is placed on top of laminate 115 on support platform 124, such as the bed of a machine tool, as shown in FIGS. 19 and 20. Typically, bracket 112 initially has a generally planar configuration and is aligned such that fold lines 125, whether previously formed or not, are aligned with the outer edges of laminate 115. If no fold lines have been previously formed, bracket 112 in its planar configuration is roughly centered on laminate 115 so that appropriate material needed to form flaps 114 is disposed on either side of laminate 115 and so that flaps 114 are of the same width on both sides of laminate 115. Thereafter, the machine tool (not shown) drives shaft 123 and thus tool 120 downwardly as illustrated in FIG. 20 so that sloped surfaces 126 on plate 122 and legs 117 and 119 engage flaps 114 bending them downwardly and about fold lines 125. Typically, tool 120 has a width less than the spacing between bolts 111A, so that tool 120 is completely disposed between bolts 111A and is centered roughly on bolt 111B. However, for different configurations of bolts 111A and 111B, a different size or shaped tool could be provided. For example, if four or more bolts 111A and 111B were utilized, tool 120 could have holes or cutouts to accommodate each of these bolts.

As flaps 114 are engaged by sloped surfaces 126, flaps 114 bend about fold lines 125. Initially, some upward bowing of surface 113 may be expected. As tool 120 continues to drop in the direction shown by the arrow in FIGS. 20 and 21, sloped surfaces 126 continue to bend flaps 114. As tool 120 continues to drop farther, the non-sloped portions of plate 122 and legs 117 and 119 engage flaps 114 to provide a sharp bend to fold lines 125, and to provide a lateral force on flaps 114 urging flaps 114 toward each other to capture laminate 115 therebetween. As shown in FIG. 21, as top plate 121 comes to rest on surface 113, surface 113 no longer demonstrates any bowing, and fold lines 125 are sharply defined by the right angles formed by the inside surfaces of top plate 121 and legs 117 and 119 and backplate 122, as illustrated in FIG. 21.

At this point, in one embodiment, tool 120 may be raised off bracket 112, and bolts 128 may be inserted and nuts 127 may be attached. In another embodiment, while tool 120 is in place, a bolt 128 may be inserted through gap 116 and a nut 127 may be applied through cutout 129. This embodiment may be preferred where fold lines 125 have not been previously formed or where fold lines 125 are not disposed along weakened or reduced thickness portions of bracket 112 and where there is some risk that once tool 120 has been removed, flaps 114 may rise upwardly slightly off laminate 115. If bolt 128 and associated nut 127 are applied while tool 120 is still in place to hold flaps 114 downwardly, once tool 120 is removed, flaps 114 will be incapable of moving, and the remainder of bolts 128 can be inserted through the other holes drilled through flaps 114 without fear of disassembly. Once all of bolts 128 and nuts 127 have been affixed, assembly 110 is ready for mounting onto a plate 22.

Figure 22:
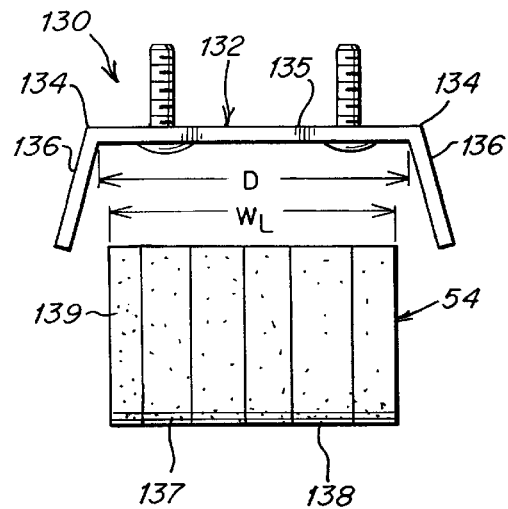
FIG. 22 is an elevational, end-view illustrating potential problems encountered with formation of pad assemblies.

Another aspect of the present invention will now be described with reference to FIGS. 22–24. FIG. 22 illustrates a problem that potentially arises when layers of laminate 54 are not of uniform thickness. This problem could arise where the sidewalls of truck tires are employed for forming laminate 54, and different truck tires are used for different layers, or where different sized truck tires are used for different layers, or where the tires used have undergone varying amounts of wear. For example, as shown in FIG. 22, layer 138 is thicker than any of the other layers, as exemplified by layer 137. Moreover, layer 139 is thinner than layer 137 or layer 138 or any of the other layers. As a result of the varying thicknesses of layers 137, 138 and 139, the overall thickness of laminate 54, $W_L$, is less than the distance D between fold lines 134 of bracket 132. As a result, as flaps 136 are folded downwardly, flaps 136 are not tightly pressed against laminate 54, resulting in the possibility that laminate 54 could shift with respect to bracket 132, or that after assembly, the movement permitted between laminate 54 and bracket 132 could result in an unstable stabilizer pad which would permit undesired movement of backhoe 10 and excessive wear of laminate 54. It is equally undesirable for the distance $W_L$ to be greater than the distance D, as it may be difficult if not impossible to bend flaps 136 into a position perpendicular to upper surface 135, resulting in a bulging assembly 130 and one in which it is very difficult to insert a bolt 53 or the like to properly secure laminate 54 to bracket 132.

Because of the unpredictability of the thicknesses of layers 137, 138 and 139, and because of quality control problems, it sometimes is difficult if not impossible to specify exactly where fold lines 134 should be located.

Figure 23:
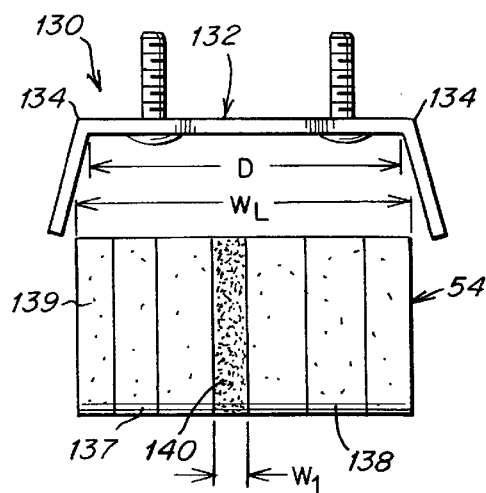
FIG. 23 is an elevational end-view illustrating another embodiment of the present invention that overcomes the problem illustrated in FIG. 22.
Figure 24:
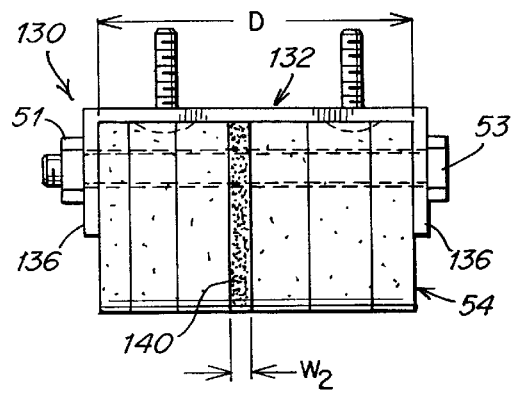
FIG. 24 is an elevational end-view of the pad assembly of FIG. 23 in its assembled condition.

One solution to the foregoing problem is illustrated in FIGS. 23 and 24. In this aspect of the invention, laminate 54 is provided with a layer 140 that is formed of a material that is more resilient than layers 137, 138 and 139 and that is suitably compressible and yet still provides the performance desired for the material of laminate 54. Layer 140 has a thickness $W_1$ which causes laminate 54 to have a width, $W_L$, greater than the distance D between fold lines 134 when layer 140 is in its fully expanded and uncompressed state. The assembly process previously described compresses layer 140 of laminate 54 so that the distance D between fold lines 134 becomes equal to the width $W_L$ of laminate 54, as illustrated in FIG. 24. Bolt 53 and nut 51 are then mounted onto assembly 130 in the usual manner to hold the assembly together.

The exact initial width $W_L$ of layer 140 in its uncompressed state is not important, so long as it produces a width $W_L$ of laminate 54 greater than distance D between fold lines 134. In this way, the assembly of layers 137, 138 and 139 could be somewhat random, so long as a layer 140 is used, and so long as the resulting width $W_L$ is somewhat greater than distance D. This embodiment permits a person assembling pad assembly 130 to do so more quickly with less attention to detail and decreases the tolerance requirements as to the permitted thicknesses of layers 137, 138 and 139. The result is a shorter assembly time and therefore a less expensive final product. Similarly, the width $W_2$ of layer 140 in its compressed state is unimportant, so long as the final width $W_2$ is one to which layer 140 may be readily compressed using the forces resulting from the assembly techniques previously described. A preferred width $W_1$ is about the same as the widths for layers 137, and a final width $W_2$ preferably is the same as the width of layer 139, or less.

Layer 140 must be sufficiently compressible that the force applied to it during assembly of pad assembly 130 is able to compress it to width $W_2$. For example, tool 120, as illustrated in FIGS. 19–21 should be sufficient to compress layer 140 from $W_1$ to a width $W_2$ as shown in FIG. 24. A preferred material for layer 140 is either an open or closed cell foam of Shore 00 and a durometer hardness in the range of between about 30 and about 65. A material formed of a rubber which has been suitably molded and provided with the desired resilience, strength and compressibility could also be used for layer 140.

Figure 25:
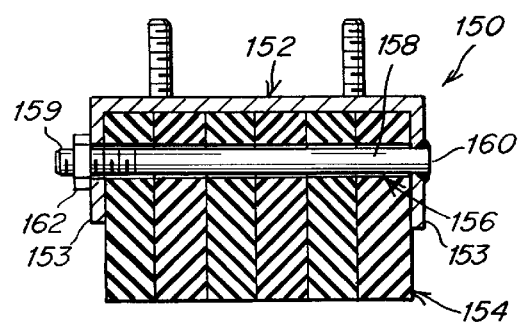
FIG. 25 is a cross-sectional end-view of a pad assembly illustrating one embodiment of an attachment element of this invention.
Figure 26:
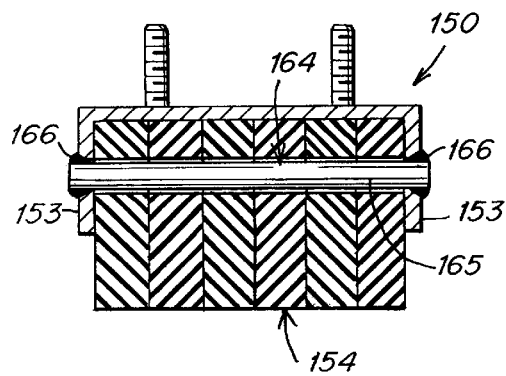
FIG. 26 is a cross-sectional end-view of a pad assembly illustrating another embodiment of the attachment element of this invention.
Figure 27:
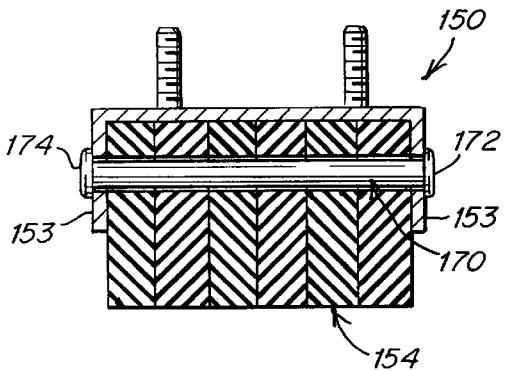
FIG. 27 is a cross-sectional end-view of a pad assembly illustrating yet another embodiment of the attachment element of this invention.

Alternative embodiments for the connection device will now be described with particular reference to FIGS. 25–27. In all respects other than those described below, the stabilizer pad assemblies of FIGS. 25–27 are identical to any one of the embodiments described with respect to FIGS. 4–24, and this aspect of FIGS. 25–27 will not be further described. FIG. 25 illustrates a pad assembly 150 with a bracket 152 and a laminate 154. Bolt 156 includes a shaft 158 having threads 159 at one end and a head 160 at the other end. Typically, head 160 is recessed with respect to flap 153 and is glued, welded, braised or soldered onto flap 153. A nut 162 is used in conjunction with threads 159 at the other end of bolt 156.

FIG. 26 illustrates an embodiment in which a pin 164 is employed. Pin 164 includes a shaft 165 and a weld 166 at each end. Preferably, as in FIG. 25, each weld 166 secures each pin 164 to its associated flap 153.

FIG. 27 illustrates another embodiment in which a rivet 170 is employed. Rivet 170 has heads 172 and 174 at opposite ends and extends through laminate 154 and flaps 153. Rivet 170 may be any conventional rivet installed by a conventional rivet applying system so long as it possesses the necessary strength and durability to hold together laminate 154 and hold laminate 154 within assembly 150.

Figure 28:
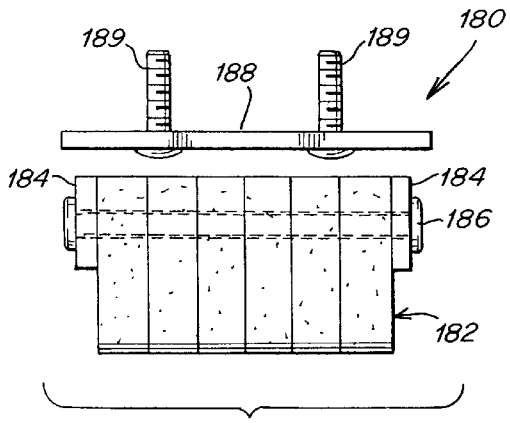
FIG. 28 is an exploded, elevational, end view of yet another embodiment of the pad assembly of this invention.
Figure 29:
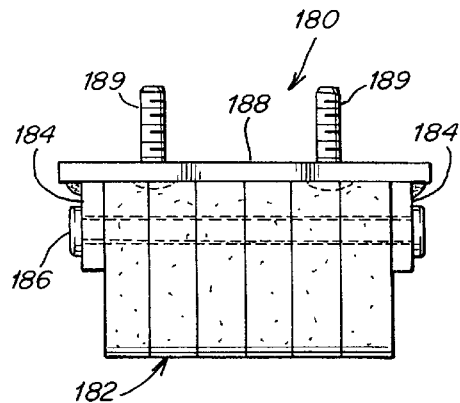
FIG. 29 is an elevational end view of the pad assembly of FIG. 28 in its assembled condition.

Another aspect of this invention will now be described with a particular reference to FIGS. 28 and 29. Pad assembly 180 includes laminate 182 which is formed of individual layers and which is identical in all respects to laminate 54. Laminate 182 is held together by two end plates 184 and an associated plurality of bolts or pins 186 extending through end plates 184 and laminate 182. Bolts or pins 186 may be a bolt with an associated nut (not shown), a rivet as depicted in FIGS. 28 and 29 or any of the other embodiments shown in FIGS. 25–27. End plates 184 typically are elongated strips of metal having a length substantially equal to that of flaps 58 as shown in FIG. 4. To provide greater strength, end plates 184 typically have a greater thickness than that of flaps 58. Disposed on top of the combination of end plates 184 and laminate 182 is a top plate 188 which is preferably welded or braised or soldered or glued onto adjacent portions of end plates 184. Top plate 188 includes bolts 189. Bolts 189 are identical to bolts 46 as shown in FIG. 4 in all material respects.

In the method of this embodiment, typically the layers of laminate 182 are precut and aligned as previously discussed. Holes are drilled in the layers of laminate 182 for bolts or pins 186 at the time the layers are cut and the holes for the layers are then aligned as laminate 182 is formed. End plates 184 are cut and drilled with holes corresponding to those found in laminate 182. Thereafter, bolts or pins 186 are passed through laminate 182 and plates 184. Finally, a plate 188 which has been precut to overlap end plates 184 a distance sufficient to allow proper bonding is placed on top of the assembly of end plates 184 and laminate 182 with bolts 189 already in place. Pressure is applied to top plate 188 to urge the heads of bolts 189 into laminate 182 so that the lower surface of top plate 188 is in engagement with or touching top surfaces of end plates 184 to allow proper welding, soldering, braising or gluing. Thereafter, plate 188 is affixed to end plates 184 along the entire length of end plates 184 preferably by soldering, welding, braising, or gluing.

This embodiment also permits the use of layers in laminate 182 which are of a different width and does not require careful control of the total width of laminate 182 so long as it falls within general ranges determined by the size of top plate 188. Therefore, the assembly process is somewhat quicker and tolerances related to the width of the layers of laminate 182 need not be as carefully controlled. As a result, the assembly costs are reduced.

A thicker material than that of bracket 52 may be used for end plates 184, and top plate 188 since the material need not be bent or folded in the assembly process. This particular construction could be used where the load and strength requirements are somewhat greater. This embodiment also obviates any steps previously discussed to avoid bowing of top plate 188.

In another aspect of the invention, in each of the foregoing embodiments, the vertical dimension of the side flaps, such as flaps 58 or end plate 184 or the distance the side flaps extend below the top surface of the bracket, may be reduced by changing the shape of the bolt or pin, such as bolt 53, which passes through the side flaps and through the laminate to hold the two together. In particular, a certain spacing of the pin or bolt 53 below the top surface of the bracket is required to provide sufficient laminate material between the pin or bolt 53 and the top of the laminate to retain bolt or pin 53 in place in the laminate and to prevent the laminate from being pulled out of the bracket during extreme stress conditions. For a rounded bolt or pin, the distance from the top surface of the laminate to the bolt or pin determines the retaining strength of the laminate, and the circumference of the bolt or pin determines the length over which the laminate engages the bolt or pin. A greater retention length and greater strength can be obtained if, instead of using a bolt or pin with a circular cross-sectional shape, as is illustrated in each of the embodiments of FIGS. 4–29, a square or rectangular pin or bolt is used. The use of flat bolt or pin surfaces requires less material between the bolt or pin and the top plate or top surface to provide the same level of holding strength for the laminate. With a square pin or bolt, the pin or bolt may be placed closer to the top plate or top surface of the bracket than for a rounded pin or bolt, and shorter side flaps or end plates are required. Thus, for a given size laminate, more laminate is exposed below the side flap or end plate. The more laminate that is exposed, the longer is the life of the assembly, or the longer is the time until the laminate is worn away to a point where there is no laminate at all below the end plate or side flap. A somewhat similar result may be achieved by using a semi-circular bolt or pin which has a flat surface facing upwardly towards the top plate or top surface. This result is desirable, because the material cost for the laminate is high and it is costly just to increase the size of the laminate layers.

Another aspect of this invention will now be described with reference to FIGS. 30–32. This embodiment also permits a greater amount of laminate to be exposed for a given laminate size, and thereby also increases the service life of the pad assembly. Pad assembly 190 includes a bracket 192 and a laminate 194 formed of a plurality of layers of material. Laminate 194 may be formed of layers 191 in the same manner as laminate 54 as previously described. Bracket 192 incudes end flaps 196 and side flaps 198. End flaps 196 and side flaps 198 may be formed or bent prior to assembly or formed at the time of assembly. In addition, as discussed with respect to previous embodiments, the fold lines for end flaps 196 and side flaps 198 may be preformed by removing material or by a score line to allow more precise formation of the flaps and to prevent bowing of the top surface of bracket 192. Each of side flaps 198 includes a lip 199, preferably extending from a lower, distal edge at an angle generally perpendicular to side flap 198. Lip 199 extends into a correspondingly cut channel 195 or notch formed in the side of laminate 194. Lip 199, when assembly 190 is fully formed, is urged into tight engagement with channel 195 to retain laminate 194 within bracket 192. End flaps 196 are also folded downwardly. To prevent side flaps 198 from springing outwardly and permitting release of laminate 194 from bracket 192, welds 193 may be applied at the corners between side flaps 198 and end flaps 196 to hold side flaps 198 in a downwardly directed position to retain lip 199 within channel 195. Bolts 197 are identical to bolts 46 in most all respects, and will not be further described.

In the preferred method of manufacturing assembly 190, bracket 192 is first cut from sheet metal stock. The fold lines for flaps 196 and 198 may be preformed, as discussed above. Laminate 194 is formed of layers 191, as discussed, and channels 195 are cut. Bolts 197 are pressed in place or otherwise inserted as previously discussed for other embodiments. Thereafter, a forming tool bends flaps 196 and 198 about their fold lines about laminate 194. During the forming process, lips 199 are urged into channels 195, and preferably welds 193 are applied at the corners of flaps 196 and 198.

Figure 30:
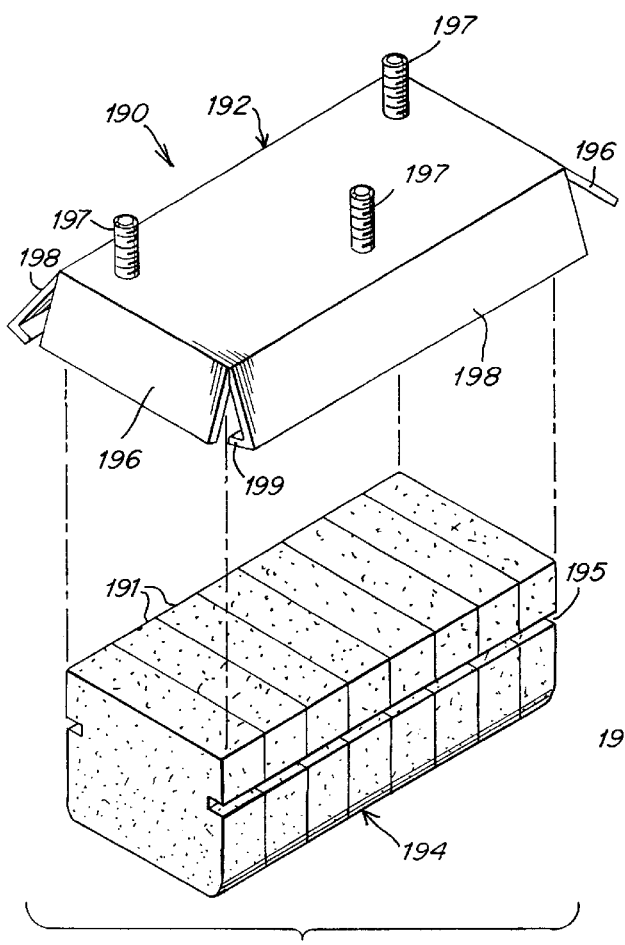
FIG. 30 is an exploded, perspective view of yet another embodiment of the pad assembly of this invention.
Figure 31:
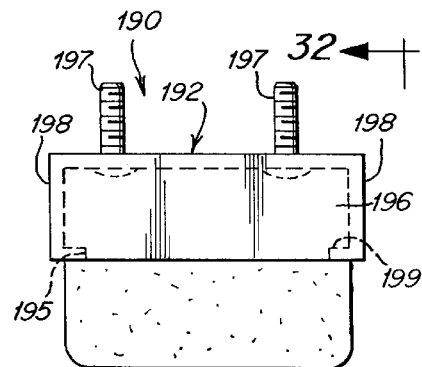
FIG. 31 is an elevational, end-view of the assembled pad assembly of FIG. 30.
Figure 32:
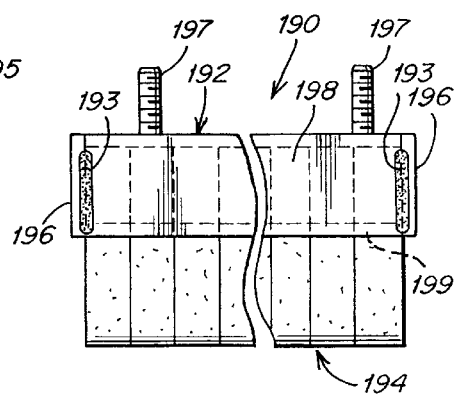
FIG. 32 is an elevational, broken, side view of the pad assembly of FIG. 30 in its assembled condition as seen along lines 32—32 in FIG. 31.

In the embodiment of FIGS. 30–32, flaps 196 and 198 need not support any bolts or pins 53. Therefore, flaps 196 and 198 need not be as long, or have the same dimension as measured from the top surface of bracket downwardly, as flaps 58. For a given size of laminate 194, more laminate is exposed below flaps 196 and 198 and assembly 190 has a longer service life than assembly 50.

In FIGS. 30–32, the orientation of the individual layers 191 of laminate 194 is crosswise to the long dimension of laminate 194 and thus bracket 192. There are three reasons for this orientation. First, the engagement between lips 199 and channels 195 is likely to be less secure than between a bolt or pin which is screwed, welded or otherwise affixed in place, and laminate 194. Therefore, laminate 194 is more likely to break free of bracket 192, and individual layers 191 are more likely to come loose, than were a bolt to be used. Therefore, it is desirable to have lip 199 engage laminate 194 in its longer direction to provide more mechanical interlocking between laminate 194 and lip 199 over a greater length and to engage each and every layer 191. Secondly, because of the somewhat less secure affixation of laminate 194 to bracket 192, it is preferred that assembly 190 be mounted on plate 22 such that the typical sideways movement of arms 14 and 16 produces frictional interaction between laminate 194 and surface 11 in a direction parallel to the direction of orientation of layers 191 rather than transverse thereto. Laminate 194 is more rigid in a direction parallel to the direction of elongation of the layers, rather than transverse thereto. Application of friction parallel to layers 191 is less likely to cause laminate 194 or individual layers 191 to pop out of bracket 192, than is the application of friction transverse of layers 191. Thus, the configuration shown in FIGS. 30–32 is most suited for the pad assembly disposed by itself at the end of plate 22 as shown in FIG. 3. Thirdly, it is difficult, if not impossible to cut layers 191 from truck tires to be sufficiently long to extend the entire length of assembly 190 in its long direction. A practical limit on the layers 191 is imposed by the nature of their source.

Figure 33:
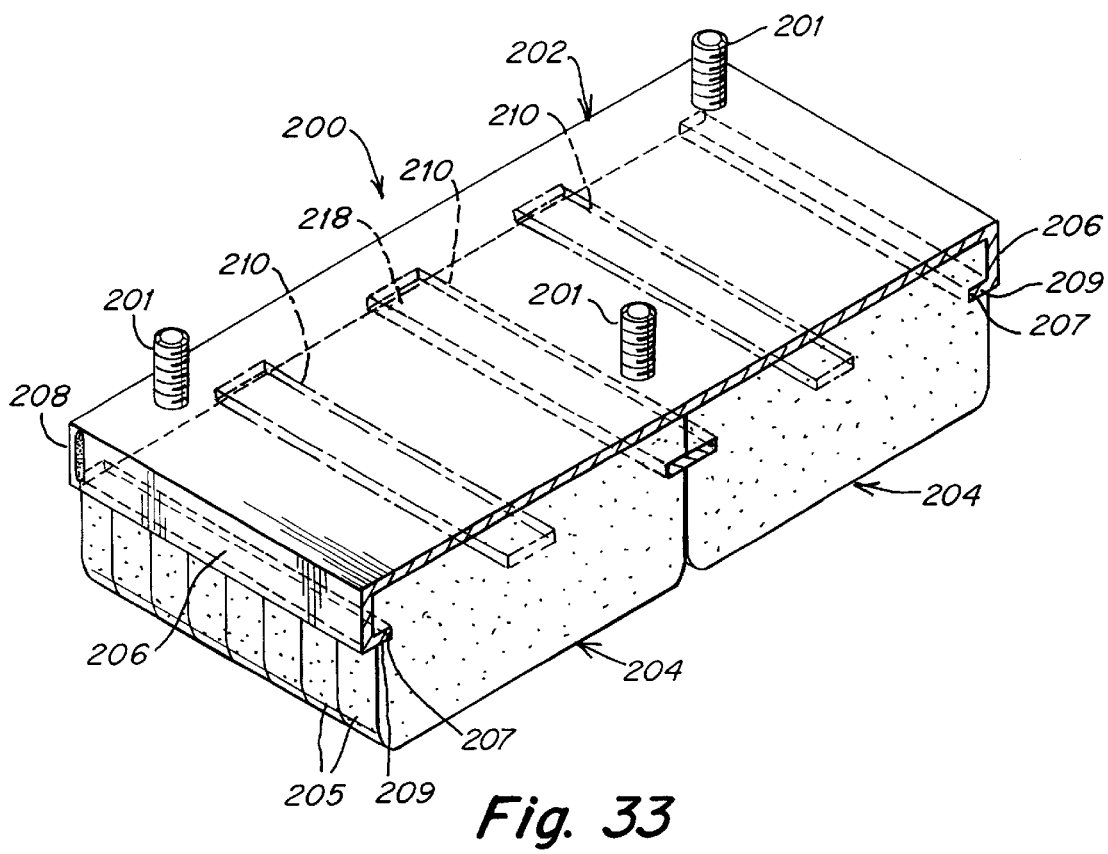
FIG. 33 is a cutaway, perspective view of yet another embodiment of the pad assembly of this invention.
Figure 34:
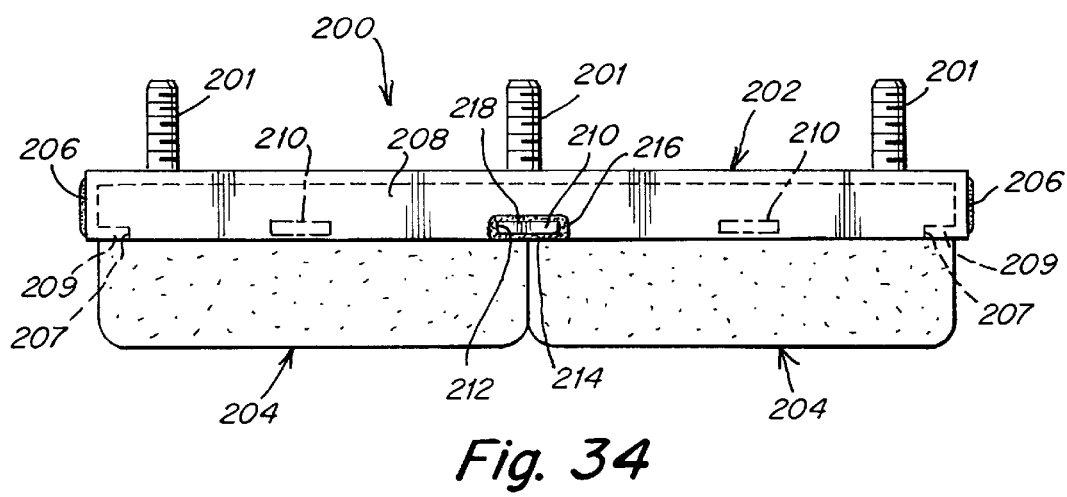
FIG. 34 is a side, elevational view of the pad assembly of FIG. 33.

FIGS. 33 and 34 illustrate a further embodiment of this aspect of the invention in which the direction of orientation of the layers of the laminate is parallel to the direction of elongation of the pad assembly 200. This embodiment is more suited to the pad assemblies 40 disposed on either side of arm 14 or 16 on plate 22, as shown in FIG. 3. Assembly 200 includes bracket 202 and at least one laminate 204 formed of layers 205 of material, as previously discussed with respect to laminate 54. Because of the difficulty and cost of forming layers 205 sufficiently long to extend the entire length of assembly 200, typically two laminates 204 are employed, each having individual layers 205 extending in the direction of elongation of assembly 200. However, a single laminate 204 extending the length of assembly 200 could also be used. As in the embodiment of FIGS. 30–32, bracket 202 includes side flaps 208 and end flaps 206. In this embodiment however, lip 209 is formed only on end flaps 206. Lips 209 extend into correspondingly formed channels 207 formed on a confronting end surface of each laminate 204. Assembly 200 also includes bolts 201, for mounting on plate 22, as previously discussed.

Because of the greater length of assembly 200 and because of the need to have a plurality of laminates 204, lips 209 and corresponding channels 207 may not be sufficient to retain laminates 204 within bracket 202. Therefore, a plurality of reinforcing splines 210 are used to provide the necessary strength. Splines 210 extend through correspondingly formed tunnels in laminates 204. Each spline 210 extends from one side flap 208 to an opposite side flap 208. Preferably, each flap 208 is provided with a correspondingly formed slot 212 which is positioned so that an associated spline end rests on a small supporting strip 214 of material which is part of side flap 208. Splines 210 preferably are each welded at 216 to side flaps 208 in respective slots 212. FIG. 33 and 34 illustrate three splines 210, one disposed at the junction of the two laminates 204, and one spline disposed approximately in the center of each of laminates 204. However, a single spline 210 could be used at the junction of laminates 204, or two splines 210 could be used, one in each laminate 204. Additional splines also could be used for greater strength and rigidity.

Preferably, splines 210 have a rectangular or square configuration with an upper flat surface 218. As previously discussed, such a square or rectangular configuration requires less supporting laminate material to provide the same level of strength as a round or oval cross-sectional configuration. Thus, as with FIGS. 30–32, the length or vertical dimension of flaps 206 and 208 may be less than the vertical dimension of flaps 58 or other like flaps in other embodiments disclosed herein, thus exposing a greater amount of laminates 204 below the lower edges of flaps 206 and 208 than with other embodiments discussed in this application for a given size of laminates 204. Like the embodiment of FIGS. 30–32, the embodiment of FIGS. 33 and 34 allows the construction of a pad assembly having a greater service life.

Another embodiment of this invention will now be described with reference to FIGS. 35 and 36. In this embodiment, pad assembly 220 includes a laminate 222, a plate 224 and a bracket 226. Plate 224 includes bolts 225 for mounting on plate 22 as previously discussed.

Laminate 222 is cut into a plurality of projecting portions 228 having valleys 229 disposed therebetween. While three projecting portions 228 are disclosed, the number of projecting portions can be more or less. Bracket 226 includes side walls 230 and end walls 232. Extending between side walls 230 are a plurality of strips 234. Each strip 234 is adapted to reside in an associated valley 229 in laminate 222. Extending inwardly toward the laminate 222 at each end wall 232 is a lip 236 which is adapted to overlie an associated projection 238 of laminate 222. Typically, bracket 226 is welded to plate 224 along end walls 232 and side walls 230. Preferably, the layers 221 of laminate 222 are aligned to extend between end walls 232 or crosswise to valleys 229 and portions 228.

Figure 5:
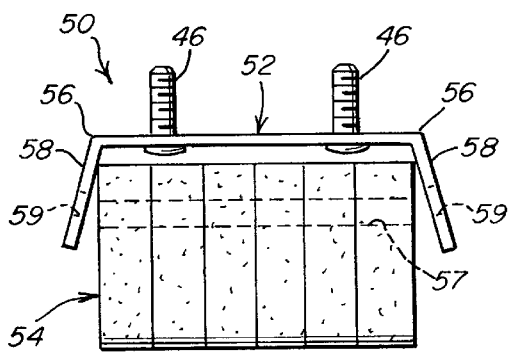
FIG. 5 is an elevational, end-view illustrating assembly of the pad assembly of FIG. 4.
Figure 35:
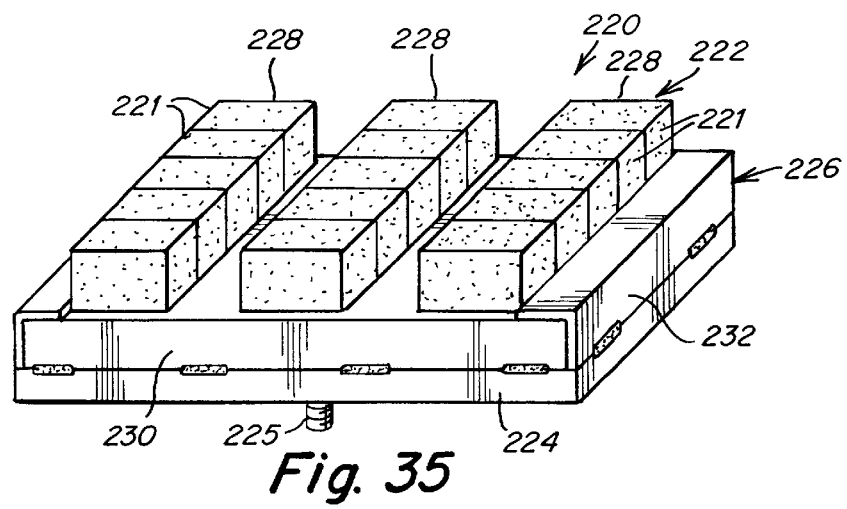
FIG. 35 is a perspective view of yet another embodiment of the pad assembly of this invention.
Figure 36:
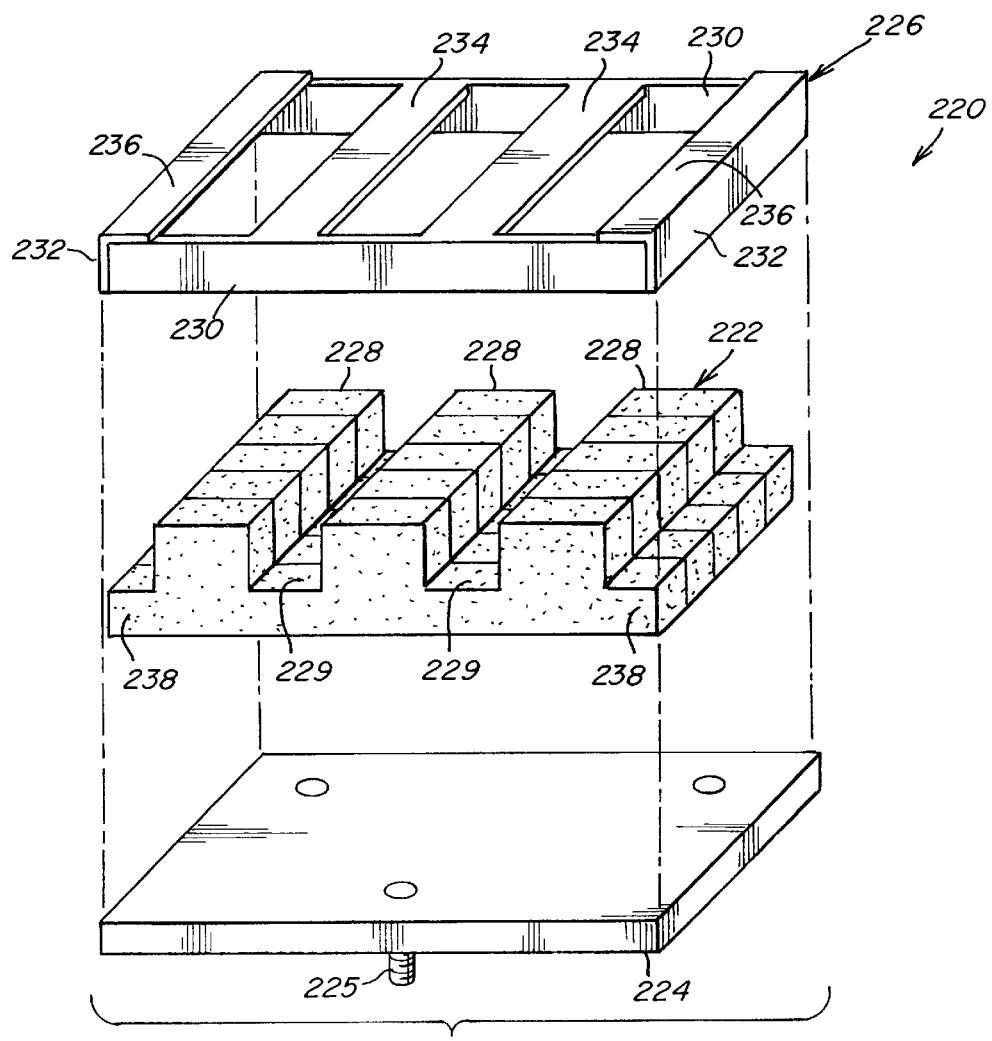
FIG. 36 is an exploded, perspective view of the pad assembly of FIG. 35.

In the preferred method of assembly of the embodiment of FIGS. 35 and 36, a laminate 222 is formed in the same manner as previously described with respect to the embodiment of FIGS. 4–6. Thereafter, valleys 229 are cut using a saw blade or some other like cutting tool, and the ends of laminate 222 are cut to form projections 238. Bracket 226 is formed from sheet metal by forming and then bending end wall 232 to form lip 236 and by cutting the remainder of bracket 226 from a piece of sheet metal stock to leave strips 234 and to form side walls 230 which are bent into the desired configuration. Bolts 225 are inserted through associated holes and held in place. Laminate 222 is placed on plate 224, and bracket 226 is placed over laminate 222. Thereafter, bracket 226 is welded or braised or soldered or glued to plate 224 along end walls 232 and side walls 230.

The embodiment of FIGS. 35 and 36 is particularly suitable where additional frictional interaction between pads 18 or 20 and surface 11 is desired. The embodiment of FIGS. 35 and 36 may provide a squeegee effect to enhance the frictional interaction with surface 11. The orientation of layers 221 in laminate 222 as shown in FIGS. 35 and 36 provides a stronger structure and more rigid projecting portions 228 to enhance the strength of the assembly. Since the orientation of layers 221 is transverse to the direction of elongation of projecting portions 228, assembly 220 could be used where there is movement of the pad in either a direction parallel to the direction of elongation of assembly 220 or crosswise thereto, since equivalent strength and rigidity is provided in either direction. If layers 221 were to be oriented parallel to the direction of elongation of projecting portions 228, the resulting structure could be too flexible to provide the desired frictional engagement in certain situations. However, such an orientation in which the layers 221 extend in the direction of elongation of projecting portions 228 may be suitable for certain other applications.

Another aspect of the present invention will now be described with particular reference to FIGS. 37–39. Since the layers of the laminate are not bonded together with glue or the like, it has been observed during use that the layers of the laminate sometimes tend to separate, particularly where the pad is subjected to considerable movement along the ground or to substantial forces in a direction transverse to the direction of elongation of the individual layers of the laminate. Such movement or forces sometimes result in the laminate layers closest to the flap of the bracket splaying outwardly away from the center of the laminate, particularly in embodiments such as those illustrated in FIGS. 28–34 where greater amounts of the laminate are exposed and unrestrained beyond the lower edges of the flaps. This splaying results in a less secure engagement between the ground surface and the pad and in more rapid deterioration of the pad assembly itself.

One solution to this splaying problem will now be described with respect to FIG. 37. Pad assembly 240 includes a bracket 242 and a laminate 250 formed of a plurality of layers 252 and 254. Bracket 242 includes flaps 244 and upper surface 246. Bolts 241 are provided for attachment of pad assembly 240 to plate 22, as previously described. Bracket 242 may be formed as previously discussed in accordance with any of the embodiments of FIGS. 4–27. Splines 248 extend through correspondingly formed tunnels in laminate 250, and each spline 248 extends from one flap 244 to an opposite flap 244. Each flap 244 is provided with correspondingly formed slots 249 into which the ends of the splines 248 extend. Preferably the ends of the splines are welded to flaps 244 within slots 249.

To maximize the amount of laminate available and to maximize the life span of assembly 240, flaps 244 extend a minimum distance from upper surface 246. Therefore, a maximum amount of laminate 250 is exposed beyond the lower edges of flaps 244. Layers 252 are disposed immediately adjacent flaps 244, and have a shorter height as measured from upper surface 246 than do layers 254. In effect, laminate 250 is stepped from flaps 244 up to layers 254. Because the height of layers 252 is less than that of layers 254, less of layers 252 is exposed beyond the edges of flaps 244. Also, layers 252 do not necessarily engage the ground surface. For these reasons and because layers 252 are restrained along a greater portion of their height as measured from upper surface 246, layers 252 are less likely to bend or splay outwardly away from central layers 254. Also, this stepped configuration makes it less likely that the layers 254 adjacent to layers 252 will splay or be bent in a direction transverse to the direction of elongation of the layers, since layers 252 will inhibit such splaying on the part of layers 254.

Figure 37:
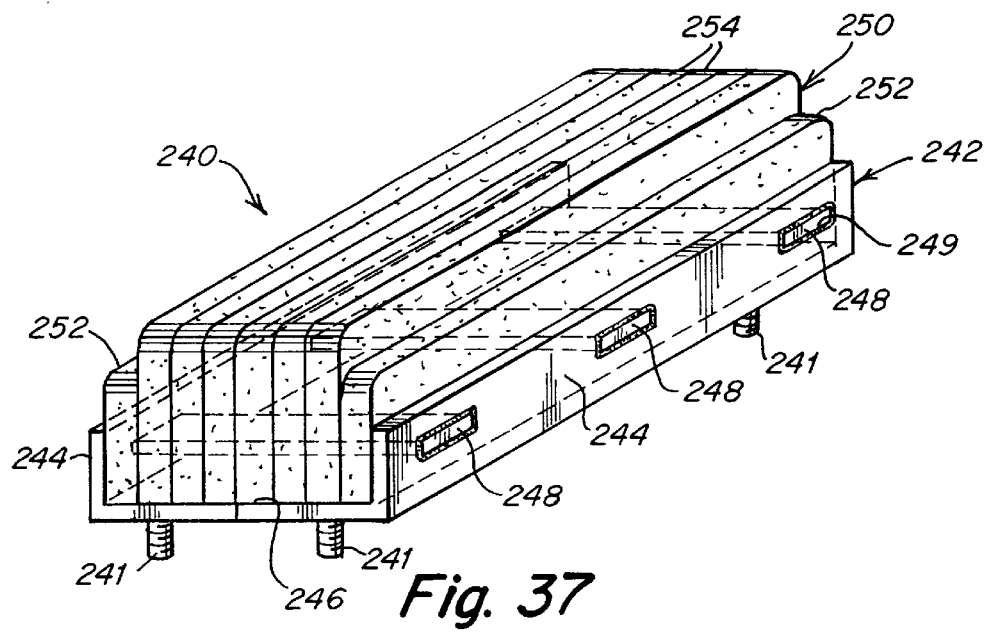
FIG. 37 is a perspective view of yet another further embodiment of the pad assembly of this invention.
Figure 38:
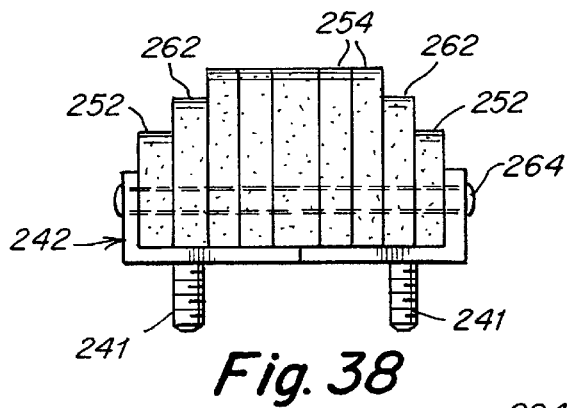
FIG. 38 is an elevational, end-view of another configuration of the embodiment of the pad assembly of FIG. 37.

FIG. 38 illustrates another configuration of the embodiment of FIG. 37. Like numbers will be used for like parts where applicable. In this embodiment, to further inhibit splaying of layers 254, intermediate layer 262 is provided between each layer 252 and adjacent layers 254. Layers 262 each have a height intermediate that of layers 254 and layers 252 as measured from surface 246, so that a double step is provided to laminate 250 on both sides. It is also noted that in FIG. 38, instead of using splines 248, a pin, bolt or rivet 264 is employed to hold laminate 250 within bracket 242. Pin, bolt or rivet 264 may be any one of those employed in the embodiments illustrated in FIGS. 4–27. While FIG. 38 illustrates two steps for laminate 250, it should be apparent to one of ordinary skill that laminate 250 could also have more than two stepped layers. In fact, each layer in the laminate could have a greater height than an adjacent layer as measured from surface 246 on a side of laminate 250 facing a flap 244, so that the height of the layers on both sides of laminate 250 increases with each layer toward the center of the laminate. The layer or layers at the center would have the greatest heights.

Figure 39:
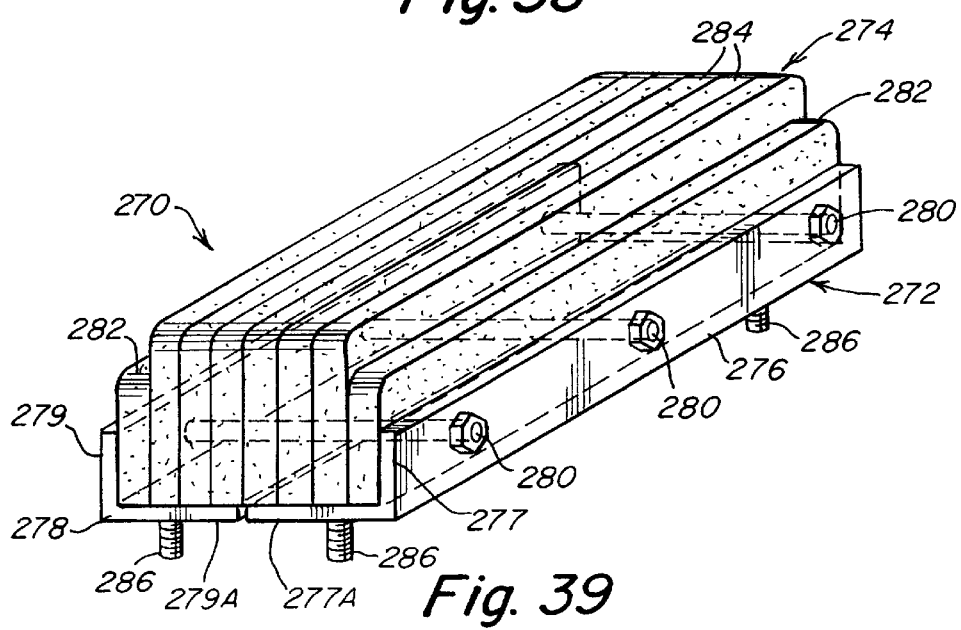
FIG. 39 is a perspective view of yet another configuration of the embodiment of the pad assembly of FIG. 37.

FIG. 39 illustrates another configuration of the embodiment of FIG. 37. Pad assembly 270 is constructed much like that described in U.S. Pat. No. 4,761,021, which is incorporated herein by reference. Pad assembly 270 includes a bracket 272 and a laminate 274. Bracket 272 includes two angle irons 276 and 278. As discussed in U.S. Pat. No. 4,761,021, angle irons 276 and 278 have respective upright legs 277 and 279 through which pins 280 pass, and respective base legs 277A and 279A. Pins 280 extend through holes in upright legs 277 and 279 and through laminate 274. Pins 280 can be bolts, rivets or pins, as previously discussed in this application with respect to FIGS. 4–27. Laminate 274 includes layers 282 and 284. As discussed with respect to FIG. 37, layers 282, which are like layers 252, have a height less than layers 284, as measured from base legs 277A and 279A, and are disposed immediately adjacent upright legs 277 and 279 of respective angle irons 276 and 278. The embodiment of FIG. 39 also provides resistance to splaying of the layers 284 of the laminate 274. Base legs 277A and 279A of respective angle irons 276 and 278 are spaced from one another along their length sufficiently so that during assembly of pad assembly 270, angle irons 276 and 278 do not touch one another in the final, assembled product, so that sufficient compression is applied to laminate 274 by upright legs 277 and 279. Bolts 286 are provided for attachment of pad assembly 270 to plate 22, as previously described. The embodiment of FIG. 39 could also be provided with the two-stepped or multiple-stepped configurations as described with respect to FIG. 38 for pad assembly 274.

In view of the above description, it is likely that modifications and improvements may occur to those skilled in the art which are within the scope of this invention. The above description is intended to be exemplary only, the scope of the invention being defined by the following claims and their equivalents.

What is claimed is:

1. Apparatus for stabilizing construction equipment comprising:
   a pad having at least one surface for frictionally engaging a supporting surface; and
   a pad assembly disposed on said one surface of said pad, said pad assembly comprising:
   a substantially resilient laminate formed of a plurality of layers, said layers being substantially parallel to one another and being disposed in a side by side relationship, said laminate having a plurality of channels cut through the laminate and formed in a ground engaging surface therefore to form a plurality of protruding portions; and
   a bracket having a plurality of openings defining strips passing through said channels for securing said laminate to a supporting plate and for preventing movement of the laminate with respect to the supporting plate;
   said protruding portions being adapted to extend through the openings with the strip being received within a channel.

2. The apparatus recited in claim 1 wherein each layer is of elongated shape having a length greater than its thickness.

3. The apparatus recited in claim 2 wherein said channels are cut through the laminate in a direction generally perpendicular to the elongated direction of said laminate.

4. The apparatus recited in claim 1 including a supporting plate for receiving and supporting the laminate.

5. The apparatus recited in claim 1 wherein the bracket has side walls for capturing the laminate.

6. The apparatus recited in claim 1 including a supporting plate for receiving and supporting the laminate and welds for securing the bracket to the supporting plate.

7. The apparatus recited in claim 1 wherein said channel is an open channel forming at least one upstanding projecting portion.

8. The apparatus recited in claim 1 wherein said resilient layers extend in a generally longitudinal direction and said at least one channel extends transverse to said longitudinal direction.

9. A stabilizer apparatus for use with construction equipment including a stabilizer arm thereof, said stabilizer apparatus including, a pad disposed at a distal end of said stabilizer arm, and a pad assembly supported from said pad, said pad assembly comprising:
   a substantially resilient laminate formed of a plurality of separate resilient layers disposed substantially parallel to one another and being arranged in a side-by-side relationship, said resilient laminate having at least one channel cut in a ground engaging surface of the laminate to form a plurality of protruding portions; and
   a bracket having a plurality of openings separated by at least one strip passing through said at least one channel for at least in part securing said laminate to the pad of the stabilizer arm, and for restricting movement of the laminate relative to the pad;
   said protruding portions being adapted to extend through the openings with the strip being received within a channel.

10. The apparatus recited in claim 9 wherein said resilient laminate has a plurality of channels cut therein to thus form a plurality of upstanding, projecting portions.

11. The apparatus recited in claim 10 wherein said bracket has a plurality of strips passing through said channels.

12. The apparatus recited in claim 11 including a supporting plate for receiving and supporting the laminate.

13. The apparatus recited in claim 12 wherein the bracket has side walls for capturing the laminate.

14. The apparatus recited in claim 13 including welds for securing the bracket to the supporting plate.

15. The apparatus recited in claim 9 including a supporting plate for receiving and supporting the laminate.

16. The apparatus recited in claim 15 wherein the bracket has side walls for capturing the laminate.

17. The apparatus recited in claim 16 including welds for securing the bracket to the supporting plate.

18. The apparatus recited in claim 9 wherein said channel is an open channel form, at least one upstanding projecting portion.

19. The apparatus recited in claim 9 wherein said resilient layers extend in a generally longitudinal direction and said at least one channel extends transverse to said longitudinal direction.

20. The apparatus recited in claim 19 wherein said laminate has plural channels and said bracket has corresponding plural strips.

21. The apparatus recited in claim 9 wherein said resilient layers extend in a generally longitudinal direction and said at least one channel extends parallel to said longitudinal direction.

22. The apparatus recited in claim 21 wherein said laminate has plural channels and said bracket has corresponding plural strips.

23. A stabilizer apparatus for use with construction equipment including a stabilizer arm thereof, said stabilizer apparatus including, a pad disposed at a distal end of said stabilizer arm, and a pad assembly supported from said pad, said pad assembly comprising:

a substantially resilient pad member having a base and at least one channel formed in a ground engaging surface of the pad member to form a plurality of protruding portions; and a bracket having a base and a plurality of openings separated by at least one strip passing through said at least one channel for at least in part securing said pad member to the pad of the stabilizer arm and for restricting movement of the pad member relative to the pad;

said protruding portions being adapted to extend through the openings with the strip being received within a channel.

24. The apparatus recited in claim 23 wherein said resilient pad member comprises a substantially resilient laminate formed of a plurality of separate resilient layers disposed parallel to one another and being arranged is a side-by-side relationship.

25. The apparatus recited in claim 24 wherein said resilient laminate has a plurality of channels cut therein to thus form a plurality of upstanding projection portions.

26. The apparatus recited in claim 25 wherein said bracket has a plurality of strips passing through said channels.

27. A stabilizer apparatus for use with construction equipment, said stabilizer apparatus comprising:

a rigid support member;

a substantially resilient laminate formed of a plurality of separate resilient layers disposed substantially in parallel to one another and being arranged in a side-by-side relationship;

said resilient laminate having at least one channel formed in the laminate to form a plurality of ground engaging protruding portions;

said rigid support member having a plurality of openings separated by at least one strip dimensioned so as to extend into said channel for securing said laminate to a pad of the stabilizer apparatus and for restricting movement of the laminate relative to the pad;

said protruding portions being adapted to extend through the openings with the strip being received within a channel.

28. The apparatus recited in claim 27 wherein said laminate channel extends substantially transverse to said parallel direction and substantially from side-to-side of said laminate.

29. A stabilizer apparatus for use with construction equipment, said stabilizer apparatus comprising:

a rigid support member;

a substantially resilient pad member having a base and at least one channel formed in the pad member to form a plurality of ground engaging protruding portions; and said rigid support member having a plurality of openings separated by at least one strip dimensioned so as to extend into said channel for securing said pad member to a pad of the stabilizer apparatus and for restricting movement of the pad member relative to the pad;

said protruding portions being adapted to extend through the openings with the strip being received within a channel.

30. The apparatus recited in claim 29 wherein said substantially resilient pad member channel extends substantially in a direction between opposed sides of said laminate.

31. The apparatus recited in claim 30 wherein said channel extends across a major dimension of said laminate.

* * * * *